US012752467B2

(12) United States Patent
Yeh et al.

(10) Patent No.: US 12,752,467 B2
(45) Date of Patent: Oct. 6, 2026

(54) INJECTION MOLDING METHOD

(71) Applicant: KING STEEL MACHINERY CO., LTD., Taichung City (TW)

(72) Inventors: Liang-Hui Yeh, Taichung City (TW); Ching-Hao Chen, Taichung City (TW)

(73) Assignee: KING STEEL MACHINERY CO., LTD., Taichung City (TW)

( * ) Notice: Subject to any disclaimer, the term of this patent is extended or adjusted under 35 U.S.C. 154(b) by 0 days.

(21) Appl. No.: 18/731,330

(22) Filed: Jun. 2, 2024

(65) Prior Publication Data

US 2024/0316843 A1 Sep. 26, 2024

Related U.S. Application Data

(62) Division of application No. 17/147,417, filed on Jan. 12, 2021, now Pat. No. 12,049,032.

(60) Provisional application No. 62/992,764, filed on Mar. 20, 2020.

(51) Int. Cl.
*B29C 45/16* (2006.01)
*B29C 45/06* (2006.01)

(52) U.S. Cl.
CPC .......... *B29C 45/1643* (2013.01); *B29C 45/06* (2013.01); *B29C 45/1628* (2013.01); *B29C 45/1657* (2013.01); *B29C 2045/1617* (2013.01)

(58) Field of Classification Search
CPC ............ B29C 45/1628; B29C 45/1671; B29C 2045/1673; B29C 2045/1631
See application file for complete search history.

(56) References Cited

U.S. PATENT DOCUMENTS

| | | | | |
|---|---|---|---|---|
| 4,120,477 | A | 10/1978 | Justamante | |
| 4,676,010 | A | 6/1987 | Cheskin | |
| 4,885,121 | A * | 12/1989 | Patel | B62D 25/24 425/134 |
| 4,923,653 | A * | 5/1990 | Matsuura | B29C 44/086 264/40.3 |

(Continued)

FOREIGN PATENT DOCUMENTS

| | | | |
|---|---|---|---|
| CN | 212911941 | U | 4/2021 |
| EP | 3881997 | A1 | 9/2021 |

(Continued)

OTHER PUBLICATIONS

Final office action of U.S. Appl. No. 17/715,570 issued by USPTO on Dec. 4, 2024.

(Continued)

*Primary Examiner* — Edmund H Lee
(74) *Attorney, Agent, or Firm* — WPAT LAW; Anthony King

(57) ABSTRACT

An injection molding method includes providing a molding device including a first mold, a second mold over the first mold and a first mold cavity defined by the first mold and the second mold; injecting a first material into the first mold cavity; forming a first layer from the first material; replacing the second mold by a third mold; injecting a second material into a second mold cavity defined by the first mold and the third mold; and forming a second layer from the second material disposed over the first layer, wherein the first material is different from the second material.

8 Claims, 36 Drawing Sheets

(56) References Cited

U.S. PATENT DOCUMENTS

| | | | | |
|---|---|---|---|---|
| 5,413,743 | A * | 5/1995 | Prophet | B29C 70/845 264/297.3 |
| 5,451,155 | A | 9/1995 | Kok et al. | |
| 5,721,039 | A * | 2/1998 | Yanagihara | B29D 11/00009 428/172 |
| 5,756,013 | A * | 5/1998 | Yanagihara | B29C 45/1615 264/297.3 |
| 6,019,929 | A | 2/2000 | Noggle et al. | |
| 6,036,908 | A * | 3/2000 | Nishida | B29C 45/1671 264/254 |
| 6,790,027 | B1 | 9/2004 | Callen et al. | |
| 7,081,179 | B2 * | 7/2006 | Hartlmeier | B29C 45/045 425/347 |
| 7,976,757 | B2 * | 7/2011 | Yang | B29C 45/062 264/297.6 |
| 2003/0017224 | A1 * | 1/2003 | Byma | B29C 45/0441 425/183 |
| 2003/0086973 | A1 * | 5/2003 | Sowden | A23G 3/04 264/328.2 |
| 2004/0094866 | A1 | 5/2004 | Boucherie | |
| 2004/0211509 | A1 * | 10/2004 | Hartlmeier | B29C 45/045 156/500 |
| 2006/0065992 | A1 * | 3/2006 | Hutchinson | B29C 45/1646 264/320 |
| 2009/0145003 | A1 | 6/2009 | Kim | |
| 2011/0146108 | A1 | 6/2011 | Grott et al. | |
| 2017/0238652 | A1 | 8/2017 | Langvin | |
| 2021/0291419 | A1 | 9/2021 | Yeh et al. | |

FOREIGN PATENT DOCUMENTS

| | | | |
|---|---|---|---|
| JP | S5669138 | A | 6/1981 |
| JP | H01200917 | A | 8/1989 |
| JP | H03278921 | A | 12/1991 |
| JP | H09150468 | A | 6/1997 |
| KR | 10-0874150 | B1 | 12/2008 |
| KR | 10-2011-0053771 | A | 5/2011 |
| KR | 20110053771 | A | 5/2011 |

OTHER PUBLICATIONS

Office Action issued by USPTO dated Jul. 30, 2024 for relevant U.S. Appl. No. 17/715,570.
Office Action issued by KIPO dated Jul. 8, 2024 for relevant KR application No. 10-2022-0081791.
English translation of Office Action issued by KIPO dated Jul. 8, 2024 for relevant KR application No. 10-2022-0081791.
Machine translation of KR10-0874150B1.
Machine translation of KR10-2011-0053771A.
Rejection Decision issued by KIPO dated Mar. 25, 2025 for relevant KR application No. 10-2022-0081791.
Machine translation of Rejection Decision issued by KIPO dated Mar. 25, 2025 for relevant KR application No. 10-2022-0081791.
Machine translation of KR20110053771A.
Office action with Search Report dated Nov. 26, 2025 issued by the CNIPA for the China Counterpart Application No. 202211159406.5.
English summary of office action of 202211159406.5.
First Examination Report dated Dec. 4, 2025 issued by the Intellectual Property India for the India Counterpart Application No. 202324025820.
English Abstract Translation of JPH01200917A.
English Abstract Translation of CN212911941U.
English Abstract Translation of JPH09-150468A.
Second Office action dated May 22, 2026 issued by the CNIPA for the China Counterpart Application No. 202211159406.5 (provided with summary of the office action).
Non-Final Office Action dated Jun. 17, 2026 issued by the USPTO for the related U.S. Appl. No. 19/069,272.
English Abstract Translation of JP56069138.
English Abstract Translation of JP03278921.
Notice of Allowance dated Aug. 19, 2026 issued by the USPTO for the related U.S. Appl. No. 19/953,003.

* cited by examiner

INJECTION MOLDING METHOD

CROSS-REFERENCE TO RELATED APPLICATION

This application is a divisional application of U.S. non-provisional application Ser. No. 17/147,417 filed on Jan. 12, 2021, now U.S. Pat. No. 12,049,032, and claimed priority of U.S. provisional application Ser. No. 62/992,764, filed on Mar. 20, 2020, which is incorporated by reference in its entirety.

TECHNICAL FIELD

The present invention is related to an injection molding system and an injection molding method, and, in particular, to an injection molding system and a method of injection molding for injecting molding an article including a plurality of layers.

BACKGROUND

Foamed polymeric material has many advantages, such as high strength, low weight, impact resistance, thermal insulation, and others. Foamed articles can be made by injection molding or extrusion molding. For example, after the polymeric material is melted and mixed with a blowing agent to form a mixture, a force or pressure is applied to the mixture to inject or extrude the mixture into a cavity of a mold, and the mixture is foamed and cooled in the cavity to form the foamed article.

However, it is necessary to improve the properties of the foamed article made by the injection molding system, such as causing different portions of the foamed article to have different properties. Therefore, there is a need for improvements to structures of the injection-molding system and the method for making foamed articles.

BRIEF SUMMARY OF THE INVENTION

One purpose of the present invention is to provide an extruding system and a method of extruding a mixture.

According to one embodiment of the present disclosure, an injection molding method is disclosed. The injection molding method includes providing a molding device including a first mold, a second mold over the first mold and a first mold cavity defined by the first mold and the second mold; injecting a first material into the first mold cavity; forming a first layer from the first material; replacing the second mold by a third mold; injecting a second material into a second mold cavity defined by the first mold and the third mold; and forming a second layer from the second material disposed over the first layer. The first material is different from the second material.

According to one embodiment of the present disclosure, an injection molding method is disclosed. The injection molding method includes providing a first carrier and a second carrier disposed adjacent to the first carrier, a first upper mold held by the first carrier, and a second upper mold held by the second carrier; disposing a first lower mold under the second upper mold; conveying the first lower mold from the second carrier to the first carrier to dispose the first lower mold under the first upper mold; and injecting a first material into a first mold cavity defined by the first lower mold and the first upper mold. The injection molding method further includes forming a first layer from the first material; conveying the first lower mold holding the first layer from the first carrier to the second carrier to dispose the first lower mold under the second upper mold; injecting a second material into a second mold cavity defined by the first lower mold and the second upper mold; and forming a second layer from the second material disposed over the first layer.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
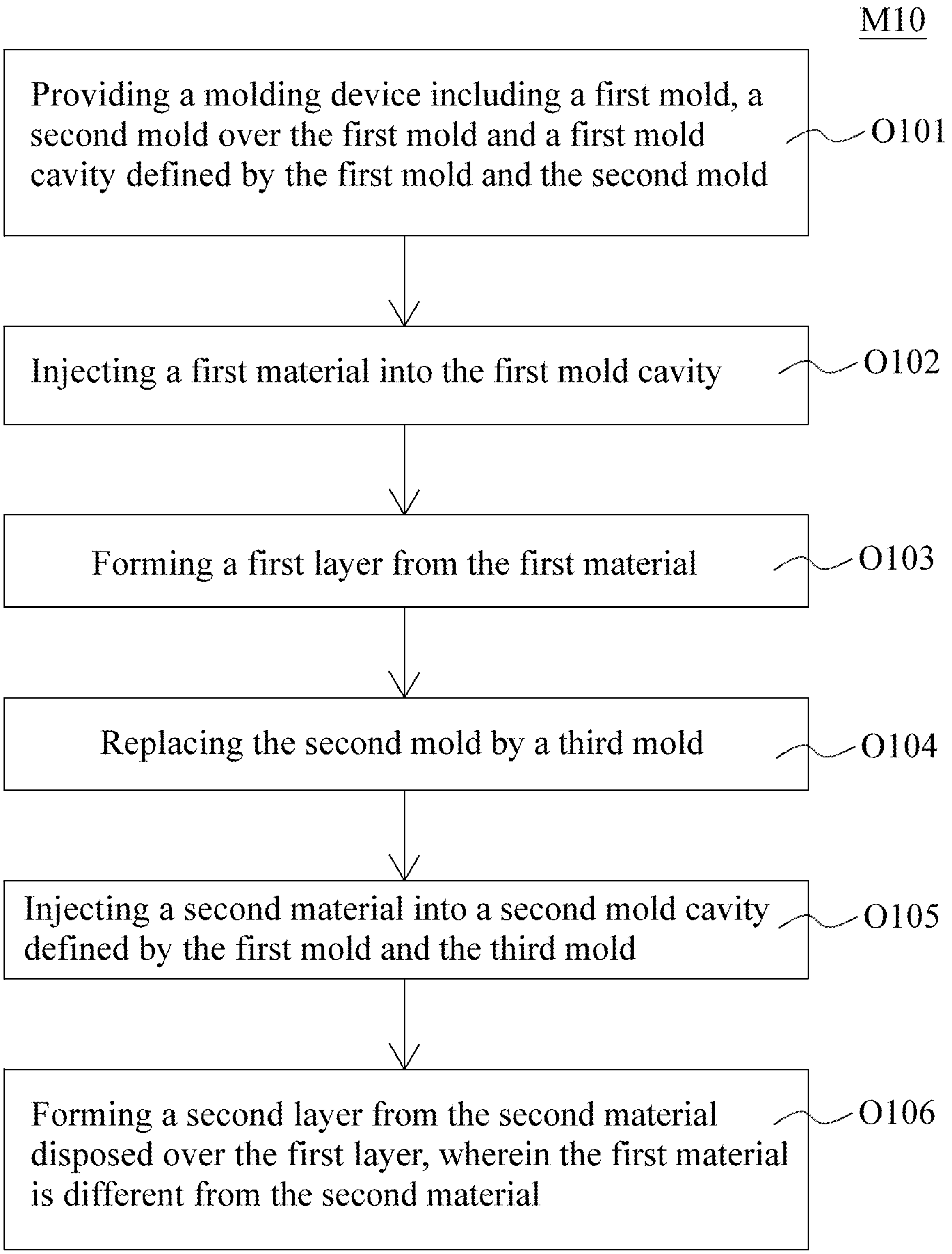
FIG. 1 is a flowchart illustrating an injection molding method according to one embodiment of the present invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages, such as those for quantities of materials, durations of times, temperatures, operating conditions, ratios of amounts, and the likes thereof disclosed herein, should be understood as modified in all instances by the term "about." Accordingly, unless indicated to the contrary, the numerical parameters set forth in the present disclosure and the attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a flowchart showing a method M10 of injection molding method in accordance with some embodiments of the present disclosure. The method M10 includes several operations: (O101) providing a molding device including a first mold, a second mold over the first mold and a first mold cavity defined by the first mold and the second mold; (O102) injecting a first material into the first mold cavity; (O103) forming a first layer from the first material; (O104) replacing the second mold by a third mold; (O105) injecting a second material into a second mold cavity defined by the first mold and the third mold; and (O106) forming a second layer from the second material disposed over the first layer, wherein the first material is different from the second material.

In order to illustrate concepts and the method M10 of the present disclosure, various embodiments are provided below. However, the present disclosure is not intended to be limited to specific embodiments. In addition, elements, conditions or parameters illustrated in different embodiments can be combined or modified to form different combinations of embodiments as long as the elements, parameters or conditions used are not in conflict. For ease of illustration, reference numerals with similar or same functions and properties are repeated in different embodiments and figures. The various operations and the thus formed articles of the injection molding method can be in various configurations as shown in any of FIGS. 2 to 38.

Figure 2:
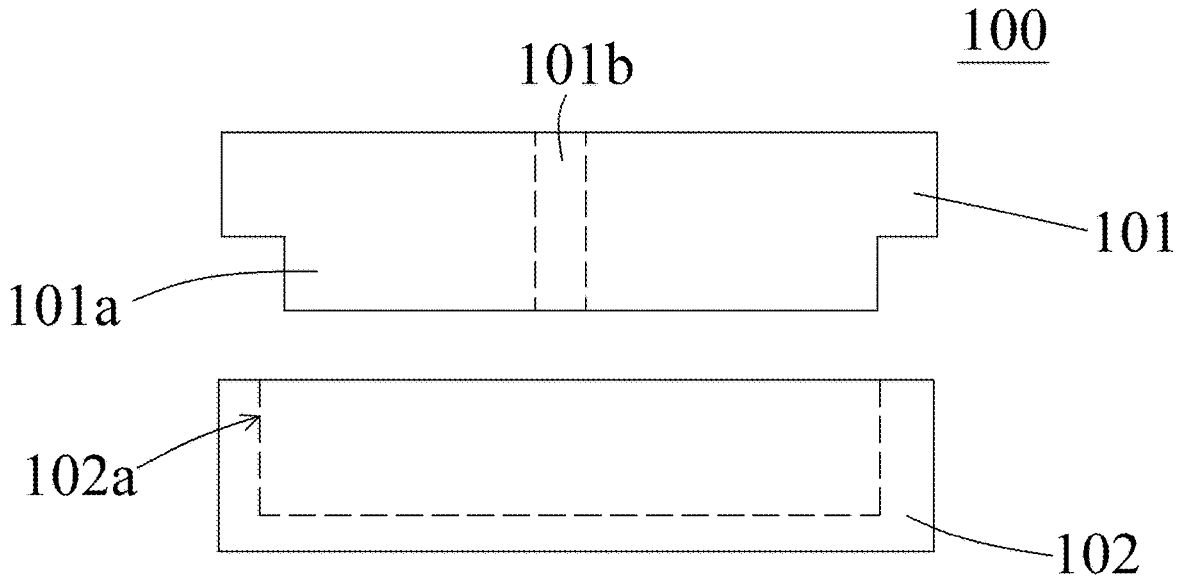
FIGS. 2-13 are schematic cross-sectional views illustrating exemplary operations in an injection molding method according to one embodiment of the present disclosure.
Figure 3:
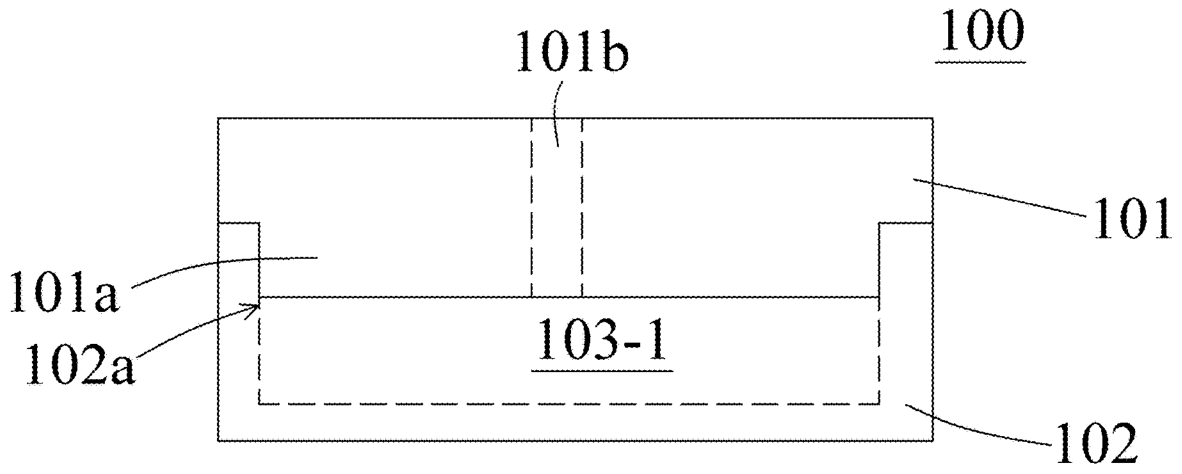

FIGS. 2 to 5 are schematic cross-sectional views illustrating a first molding device 100 of the operation O101 of the method M10 in accordance with some embodiments of the present disclosure. In some embodiments, the method M10 of injection molding method includes step O101, which includes providing a first molding device 100 including a first mold, a second mold over the first mold and a first mold cavity defined by the first mold and the second mold. In some embodiments, a first molding device 100 is provided or received as shown in FIG. 2 or 3. In some embodiments, the first molding device 100 is configured to forming an article. In some embodiments, the first mold is a lower mold 102, and the second mold is a first upper mold 101.

In some embodiments, the first molding device 100 includes the first upper mold 101 and the lower mold 102. In some embodiments, the first upper mold 101 corresponds to the lower mold 102 in some configurations such as dimension, shape or the like. The first upper mold 101 can be placed on and engaged with the lower mold 102. In some embodiments, the provision of the first molding device 100 includes conveying the lower mold 102 towards the first upper mold 101. As such, the lower mold 102 would be disposed under the first upper mold 101 for subsequent steps. In some embodiments, the first upper mold 101 is aligned with the lower mold 102. In some embodiments as shown in FIG. 2, the first molding device 100 is in an open configuration.

In some embodiments, the first upper mold 101 includes a protrusion 101*a* protruded from the first upper mold 101. In some embodiments, the lower mold 102 includes a recess 102*a* indented into the lower mold 102. The protrusion 101*a* is receivable by the recess 102*a*. In some embodiments, the protrusion 101*a* and the recess 102*a* are configured complementary with each other, such that the first upper mold 101 is engageable with the lower mold 102 when the first molding device 100 is in a closed configuration as shown in FIG. 3. In some embodiments, a first mold cavity 103-1 is formed when the first molding device 100 is in the closed configuration as shown in FIG. 3. Although FIGS. 2 and 3 illustrate only one recess 102*a* at the lower mold 102, it can be understood that any suitable numbers of the recess 102*a* can be configured at the lower mold 102.

In some embodiments, the first upper mold 101 includes a first passage 101*b* extending through the first upper mold 101. In some embodiments, the first passage 101*b* is communicable with the first mold cavity 103-1 when the first molding device 100 is in the closed configuration as shown in FIG. 3. The first mold cavity 103-1 is accessible through the first passage 101*b*. For simplicity and clarity, only one first passage 101*b* is illustrated, however, it can be understood that any suitable numbers of the first passage 101*b* can be configured at the first upper mold 101. In some embodiments, the number of the first passage 101*b* is identical to the number of the recess 102*a*. In some embodiments, the number of the recess 102*a* is more than the number of the first passages 101*b*. In some embodiments, the number of the first passages 101*b* is more than the number of the recess 102*a*. In some embodiments, the first passage 101*b* corresponds to the recess 102*a*. In some embodiments, each of the first passages 101*b* corresponds to one or more of the recesses 102*a*.

In some embodiments, instead of configuring the first passage 101*b* at the first upper mold 101, the first passage 101*b* can be configured at the lower mold 102 for accessing the recess 102*a* or the first mold cavity 103-1. In some embodiments, the first passage 101*b* can be configured at a sidewall of the lower mold 102 or any other suitable positions as long as the first passage 101*b* is communicable with the recess 102*a* or the first mold cavity 103-1.

Figure 4:
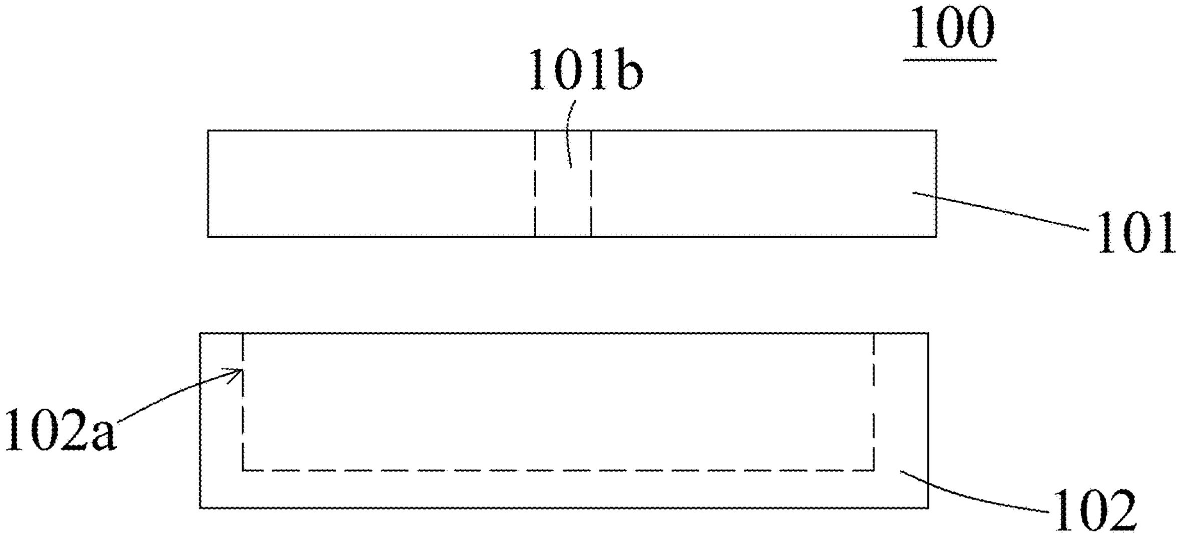
Figure 5:
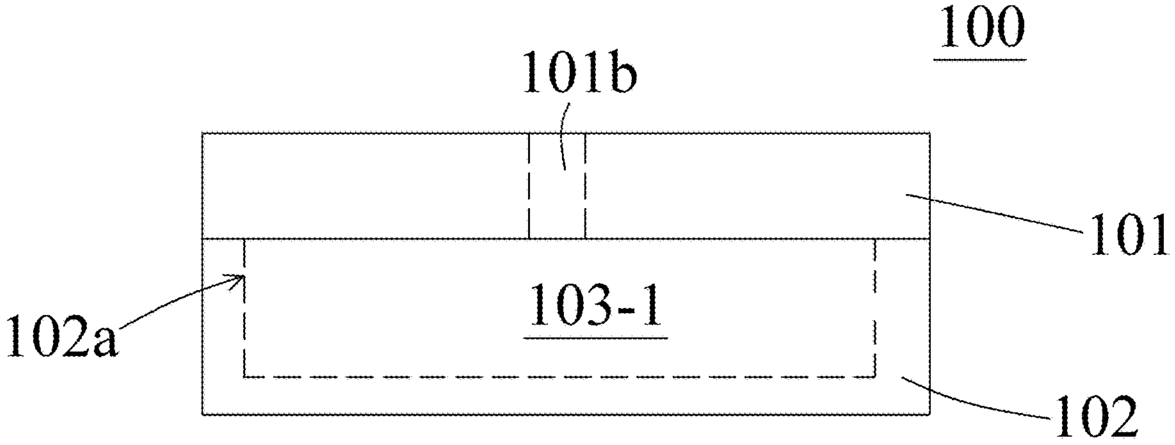

In some embodiments, the first upper mold 101 may not include any protrusion. In some embodiments as shown in FIGS. 4 and 5, the first upper mold 101 does not include the protrusion 101*a* as described above or illustrated in FIGS. 2 and 3. For simplicity and clarity, only the first molding device 100 having the protrusion 101*a* as shown in FIGS. 2 and 3 is illustrated for describing the injection molding method below. However, it can be understood that the first molding device 100 without the protrusion 101*a* as shown in FIGS. 4 and 5 can also be used for the injection molding method described below.

In some embodiments, instead of configuring the protrusion 101*a* integrally formed with the first upper mold 101, a removable plate (not shown) can be used. In some embodiments, the removable plate can be placed between the first upper mold 101 and the lower mold 102 for adjusting a volume of the first mold cavity 103-1. For example, the first mold cavity 103-1 would be reduced if the removable plate is inserted into the first mold cavity 103-1 and disposed between the first upper mold 101 and the lower mold 102. In some embodiments, the removable plate is disposed between the protrusion 101*a* and the lower mold 102. As such, the volume of the first mold cavity 103-1 can be adjusted by insertion of the removable plate between the first upper mold 101 and the lower mold 102 when the first molding device 100 is closed.

Referring back to FIG. 2, at the beginning of the injection molding method M10, the first molding device 100 is in the open configuration. The first molding device 100 is then changed to the closed configuration as shown in FIG. 3. In some embodiments, the first molding device 100 is closed by applying a first clamping force (not shown) over or around the first molding device 100. In some embodiments, the first clamping force is continuously applied over the first molding device 100 during formation of the article or for a predetermined period of time. In some embodiments, the first upper mold 101 is tightly engaged with the lower mold 102 when the first molding device 100 is closed.

After the closing of the first molding device 100, the first mold cavity 103-1 is formed as shown in FIG. 3. The first mold cavity 103-1 is configured to hold material and form the article within the recess 102*a*. The first mold cavity 103-1 is communicable with the first passage 101*b*. In some embodiments, the first mold cavity 103-1 is sealed when the first molding device 100 is closed.

FIGS. 6 to 9 are schematic cross-sectional views illustrating the first molding device 100 of the operations O102 and O103 of the method M10 in accordance with some embodiments of the present disclosure. In some embodiments, the method M10 of injection molding method includes step O102, which includes injecting a first material into the first mold cavity. In some embodiments, the method M10 of injection molding method includes step O103, which includes forming a non-foamed layer from the first material.

Figure 6:
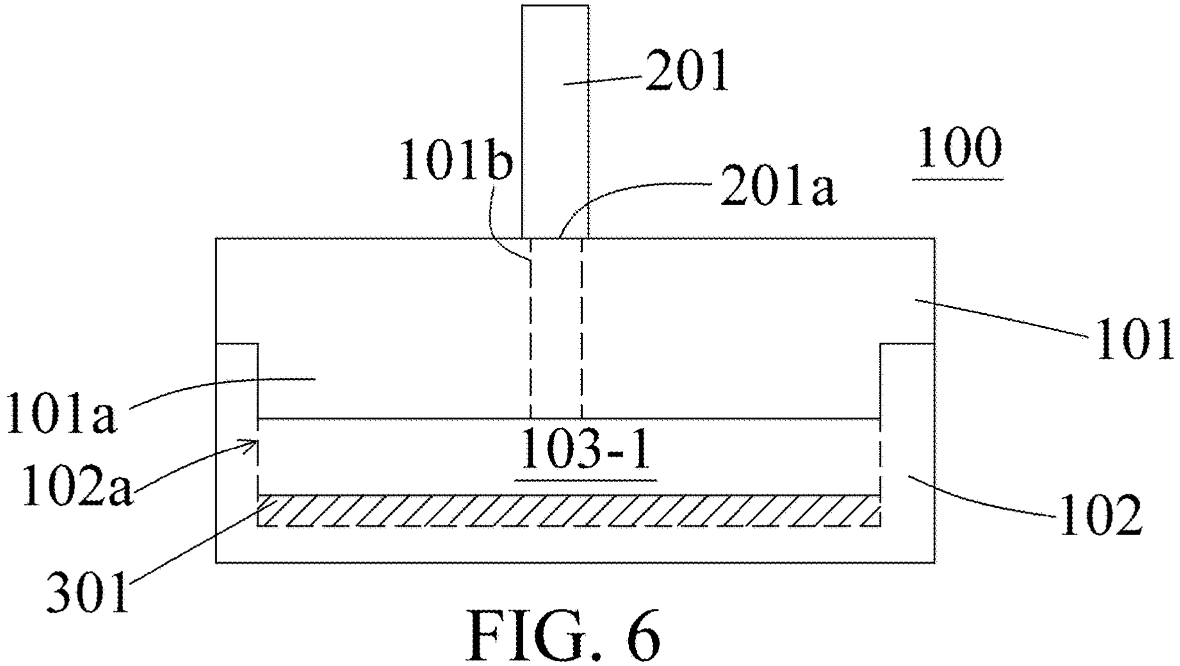

When the first molding device 100 is closed, a first material 301 is injected into the first mold cavity 103-1 through the first passage 101*b* as shown in FIG. 6. In some embodiments, the first material 301 is injected into the first mold cavity 103-1 from a first injector 201 via a first outlet 201*a* of the first injector 201. The first material 301 is flowed from the first outlet 201*a* into the first mold cavity 103-1 along the first passage 101*b*. In some embodiments, the first outlet 201*a* is engaged with the first passage 101*b* upon injection of the first material 301. In some embodiments, the first outlet 201*a* of the first injector 201 is extendable towards or retractable from the first passage 101*b*. In some embodiments, the first material 301 includes thermoplastic polyurethane (TPU), polyurethane (PU), plastics or any other suitable materials. In some embodiments, the first material 301 is foamable material or less foamable material. In some embodiments, the first material 301 is non-foamable material.

During or after injecting the first material 301 into the mold cavity 103-1, in some embodiments, an external force (not shown) may be applied over the first upper mold 101 or the lower mold 102 to press the first material 301. In some embodiments, the external force is substantially greater than or equal to 150 Newton (N). In some embodiments, the external force is substantially greater than or equal to 200N. In some embodiments, the external force is applied for a predetermined period of time such as several seconds. In some embodiments, the first molding device 100 is idle for a predetermined period of time such as several seconds for cooling of the first material 301. As a result, a first layer 301' including the first material 301 is formed within the mold cavity 103-1, as shown in FIG. 6. In some embodiments, the first layer 301' is a foamed layer or a less foamed layer. In some embodiments, the first layer 301' is a non-foamed layer.

Figure 7:
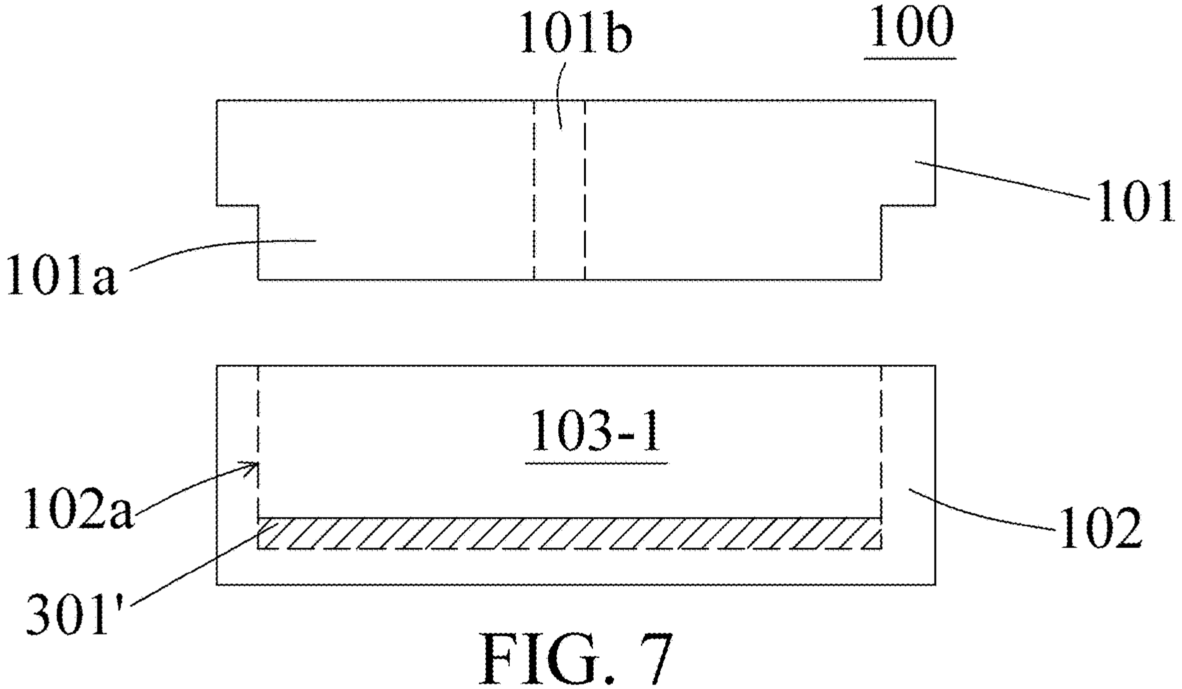
Figure 8:
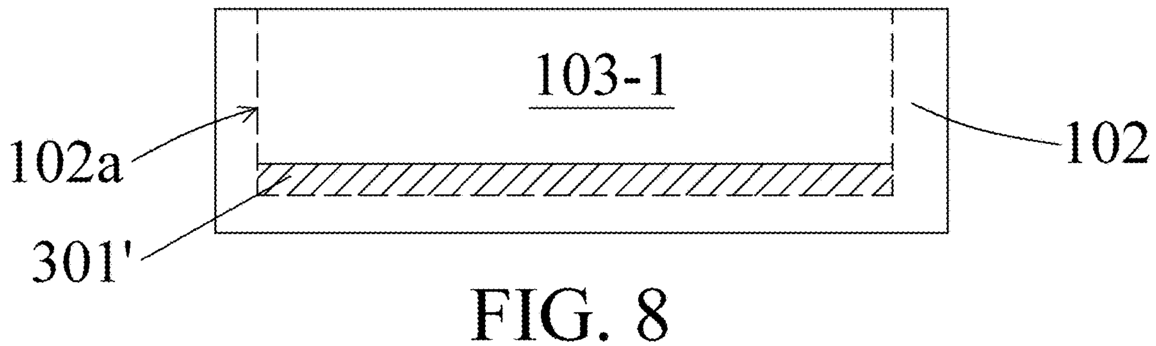

After the formation of the first layer 301', the first injector 201 leaves the first molding device 100, and the first upper mold 101 is disengaged and withdrawn from the lower mold 102, as shown in FIG. 7. The first outlet 201*a* is also disengaged from the first passage 101*b*. The first molding device 100 is changed from the closed configuration as illustrated in FIG. 6 to the open configuration as illustrated in FIG. 7. Further, in some embodiments, the lower mold 102 is conveyed away from the first upper mold 101 as shown in FIG. 8.

In some embodiments, the lower mold 102 is conveyed in a suitable speed or by a suitable force, such that the vibration of the lower mold 102 during the conveying is minimized or even prevented. Reduction or prevention of the vibration of the lower mold 102 during the conveying allows the first layer 301' stably disposed in the first mold cavity 103-1 and temporarily adhered to the lower mold 102. In some embodiments, the first layer 301' can be firmly attached to the lower mold 102 during the conveying by any suitable mechanism such as a sufficient friction between the first layer 301' and the inner sidewall of the lower mold 102, a tab (not shown) protruded from the lower mold 102 towards the recess 102*a*, etc. Therefore, reliability and quality of the first layer 301' can be improved or increased.

Optionally, the lower mold 102 is then conveyed to another station for further treatment. For example, a surface treatment is performed after the formation of the first layer 301'. A surface of the first layer 301' would be polished or treated to increase smoothness, or the first layer 301' would be heat treated for activation, or any other suitable treatments.

Figure 9:
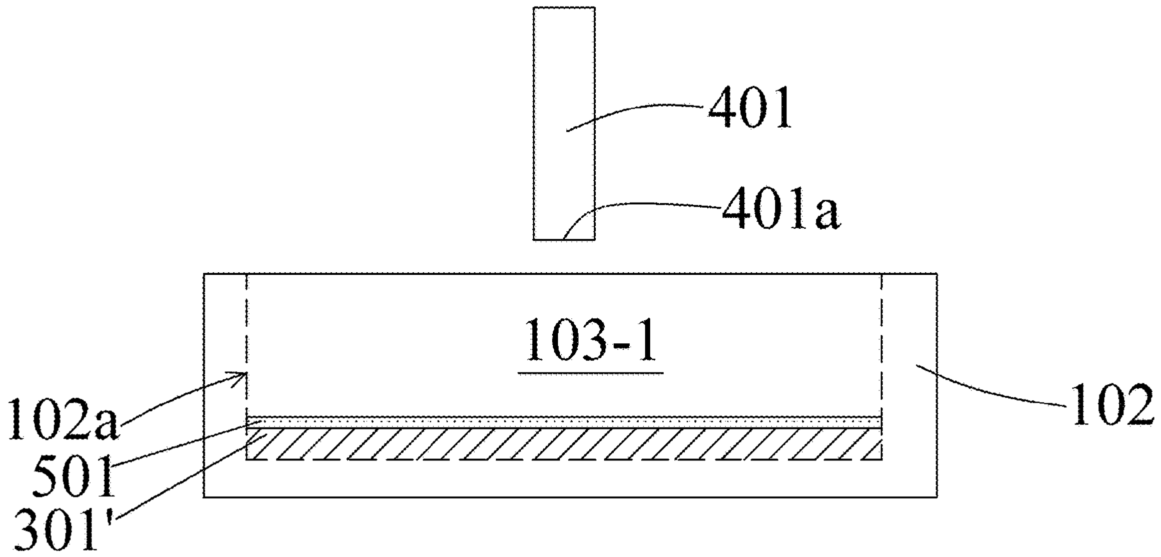

After the formation of the first layer 301' or treatment of the first layer 301', an adhesive 501 is applied on the surface of the first layer 301' as shown in FIG. 9. In some embodiments, a second injector 401 is disposed over the lower mold 102, and the adhesive 501 is dispensed from the second injector 401 through a second outlet 401*a* of the second injector 401 towards the first layer 301'. In some embodiments, the second outlet 401*a* of the second injector 401 is extendable towards or retractable away from the lower mold 102. In some embodiments, the first layer 301' is coated with the adhesive 501.

Figure 10:
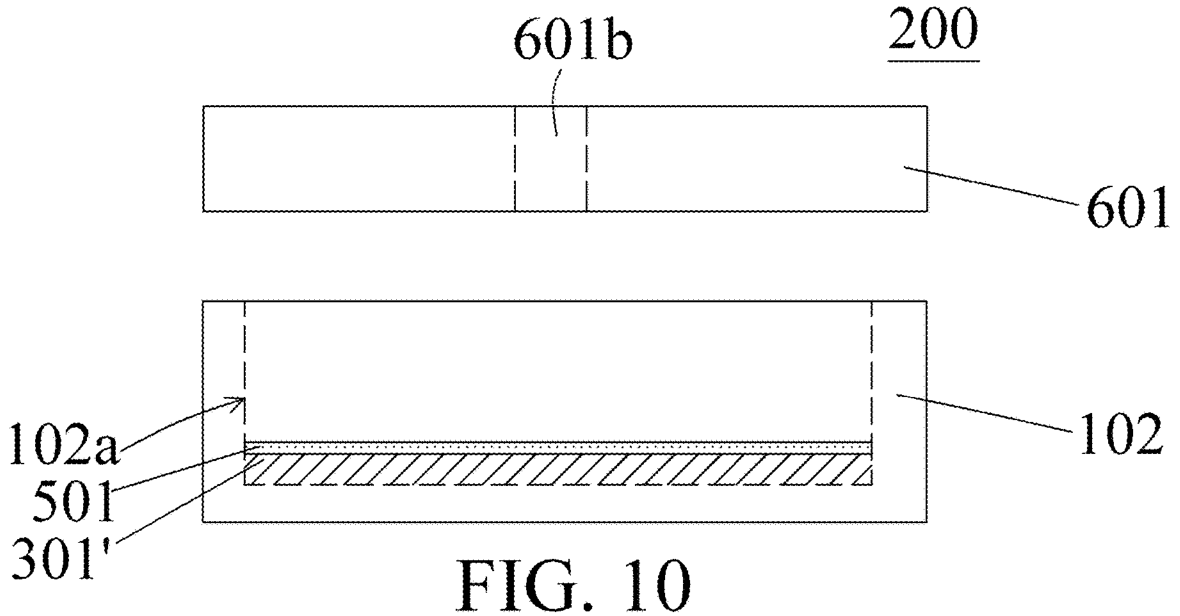
Figure 11:
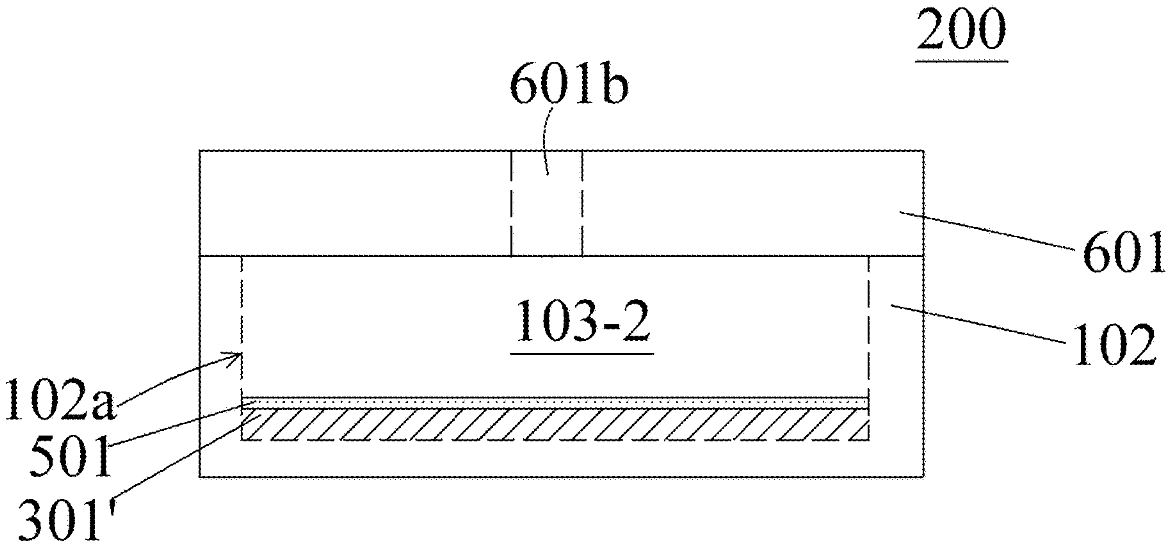

FIGS. 10 and 11 are schematic cross-sectional views illustrating a second molding device 200 of the operation O104 of the method M10 in accordance with some embodiments of the present disclosure. In some embodiments, the injection molding method M10 includes step O104, which includes replacing the second mold by a third mold. In some embodiments, the replacement of the second mold includes removing the second mold, disposing the third mold over the first mold and moving the first mold towards the third mold to form the second mold cavity. In some embodiments, the second mold is the first upper mold 101, the first mold is the lower mold 102, and the third mold is a second upper mold 601.

After the formation of the first layer 301' or the application of the adhesive 501, the lower mold 102 is conveyed towards another station including a second upper mold 601 as shown in FIGS. 10 and 11. In some embodiments, the lower mold 102 at least including the first layer 301' is conveyed towards the second upper mold 601. The lower mold 102 is disposed under the second upper mold 601 as shown in FIG. 10. It can be understood that a second molding device 200 refers to the second upper mold 601 and the lower mold 102.

In some embodiments, the second upper mold 601 corresponds to the lower mold 102 in some configurations such as dimension, shape or the like. The second upper mold 601 can be placed on and engaged with the lower mold 102. In some embodiments, the provision of the second molding device 200 includes conveying the lower mold 102 towards the second upper mold 601. As such, the lower mold 102 would be disposed under the second upper mold 601 for subsequent steps. In some embodiments, the second upper mold 601 is aligned with the lower mold 102. In some embodiments as shown in FIG. 10, the second molding device 200 is in an open configuration.

In some embodiments, the second upper mold 601 includes a second passage 601*b* extending through the second upper mold 601. In some embodiments, the second passage 601*b* is communicable with a second mold cavity 103-2 when the second molding device 200 is in the closed configuration as shown in FIG. 11. The second mold cavity 103-2 is accessible through the second passage 601*b*. For simplicity and clarity, only one second passage 601*b* is illustrated, however, it can be understood that any suitable numbers of the second passage 601*b* can be configured at the second upper mold 601. In some embodiments, the number of the second passage 601*b* is identical to the number of the recess 102*a*. In some embodiments, the number of the recess 102*a* is more than the number of the second passage 601*b*. In some embodiments, the number of the second passage 601*b* is more than the number of the recess 102*a*. In some embodiments, the second passage 601*b* corresponds to the recess 102*a*. In some embodiments, each second passage 601*b* corresponds to one or more of the recesses 102*a*.

In some embodiments, instead of configuring the second passage 601*b* at the second upper mold 601, the second passage 601*b* can be configured at the lower mold 102 for accessing the recess 102*a* or the second mold cavity 103-2. In some embodiments, the second passage 601*b* can be configured at a sidewall of the lower mold 102 or any other suitable positions as long as the second passage 601*b* is communicable with the recess 102*a* or the second mold cavity 103-2.

In some embodiments, the second molding device 200 is then changed from the open configuration as shown in FIG. 10 to the closed configuration as shown in FIG. 11. In some embodiments, the second molding device 200 is closed by applying a second clamping force (not shown) over or around the second molding device 200. In some embodiments, the second clamping force is continuously applied over the second molding device 200 during formation of the article or for a predetermined period of time. In some embodiments, the second upper mold 601 is tightly engaged with the lower mold 102 when the second molding device 200 is closed. In some embodiments, the second clamping force is substantially less than the first clamping force.

After the closing of the second molding device 200, a second mold cavity 103-2 is formed as shown in FIG. 11. The second mold cavity 103-2 is configured to hold material and form the article within the recess 102*a*. The second mold cavity 103-2 is communicable with the second passage 601*b*. In some embodiments, the second mold cavity 103-2 is sealed when the second molding device 200 is closed.

Figure 12:
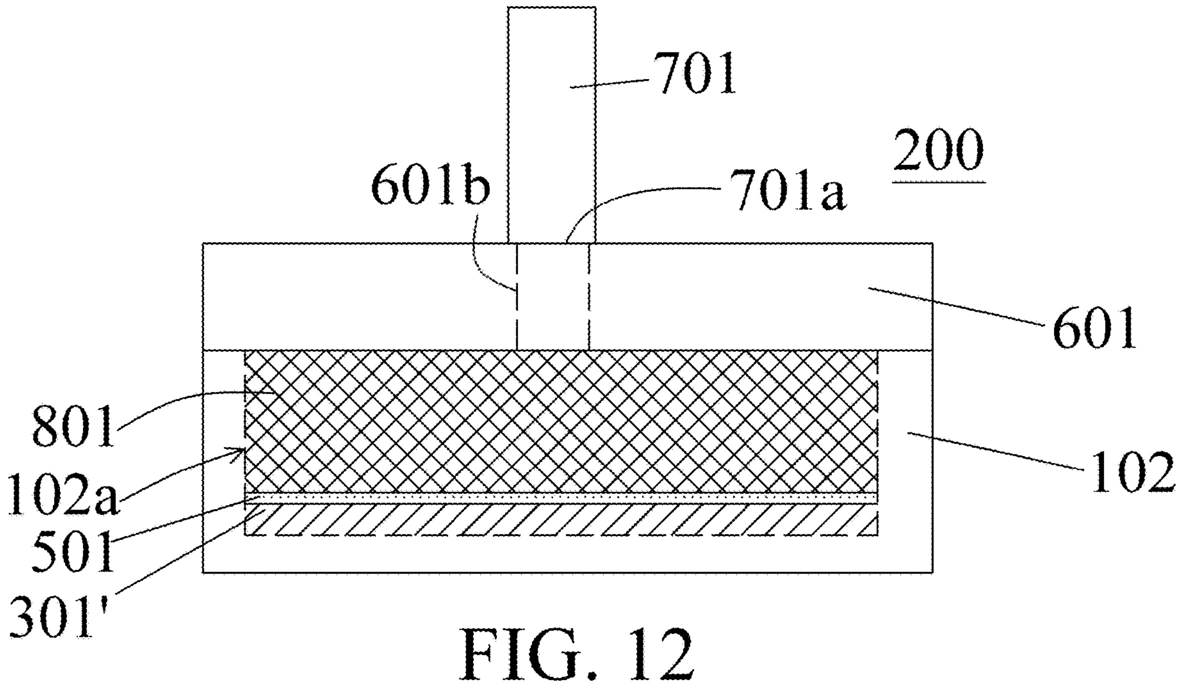
Figure 13:
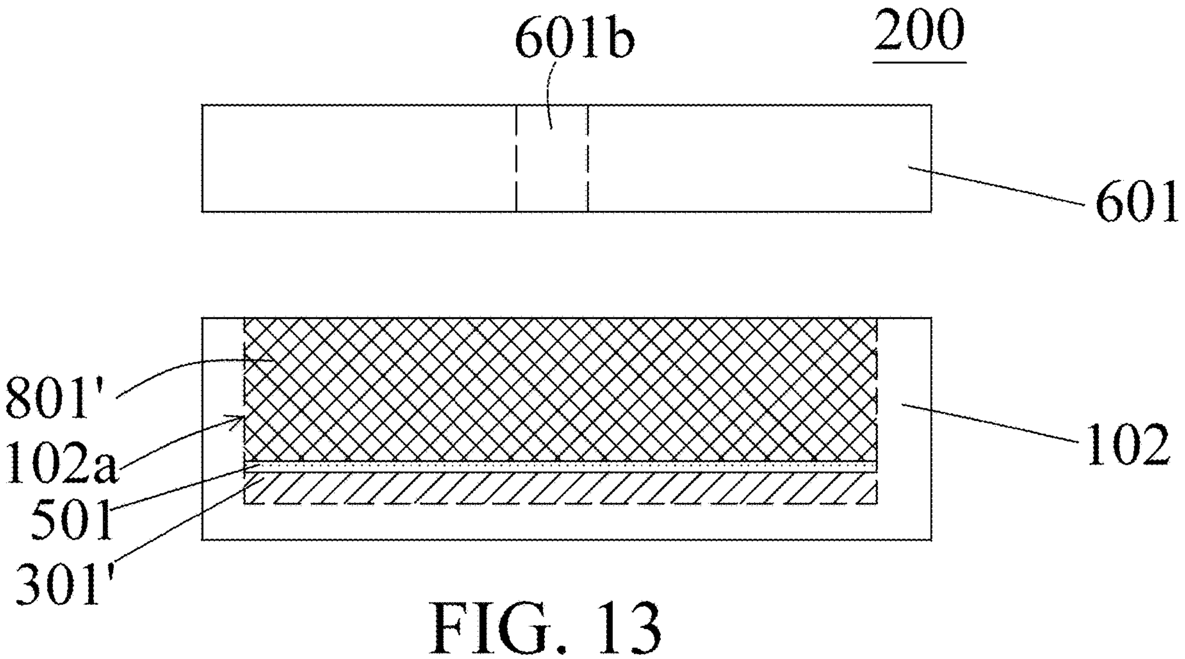

FIGS. 12 and 13 are schematic cross-sectional views illustrating the second molding device 200 of the operations O105 and O106 of the method M10 in accordance with some embodiments of the present disclosure. In some embodiments, the method M10 of injection molding method includes step O105, which includes injecting a second material into a second mold cavity defined by the first mold and the third mold, the first material is different from the second material. In some embodiments, the method M10 of injection molding method includes step O106, which includes forming a foamed layer from the second material disposed over the non-foamed layer.

When the second molding device 200 is closed, a second material 801 is injected into the second mold cavity 103-2 through the second passage 601*b* as shown in FIG. 12. In some embodiments, the second material 801 is injected into the second mold cavity 103-2 from a third injector 701 via a third outlet 701*a* of the third injector 701. The second material 801 is flowed from the third outlet 701*a* into the second mold cavity 103-2 along the second passage 601*b*. In some embodiments, the third outlet 701*a* is engaged with the second passage 601*b* upon injection of the second material 801.

In some embodiments, the second material 801 includes expanded thermoplastic polyurethane (ETPU), thermoplastic polyurethane (TPU), polyurethane (PU), plastics or any other suitable materials. In some embodiments, the second material 801 is foamable material or highly foamable material. In some embodiments, the second material 801 includes a blowing agent prior to injection from the third injector 701. In some embodiments, a polymeric material is mixed with the blowing agent to become the second material 801 prior to the injection from the third injector 701. In some embodiments, the second material 801 is a mixture of the polymeric material and the blowing agent. In some embodiments, the blowing agent can be any type of physical blowing agent known to those of ordinary skill in the art, such as atmospheric gases (e.g., nitrogen, carbon dioxide), hydrocarbons, chlorofluorocarbons, noble gases, or mixtures thereof. The blowing agent may be supplied in any flowable physical state, for example, a gas, liquid, or supercritical fluid. In some embodiments, the blowing agent is in the supercritical fluid state.

After injecting the second material 801 into the second mold cavity 103-2, the second molding device 200 is idle for a predetermined period of time such as several seconds for foaming and cooling of the second material 801. As a result, a second layer 801' including the second material 801 is formed within the second mold cavity 103-2. In some embodiments, the second layer 801' is a foamed layer.

In some embodiments, a density of the foamed layer is substantially less than a density of the non-foamed layer. In some embodiments, density of the second layer 801' is substantially less than density of the first layer 301'. In some embodiments, an elasticity of the foamed layer is substantially greater than an elasticity of the non-foamed layer. In some embodiments, elasticity of the second layer 801' is substantially greater than elasticity of the first layer 301'. In some embodiments, the first layer 301' is harder than the second layer 801'. In some embodiments, the second layer 801' has a greater abrasion resistance than the first layer 301'.

In some embodiments, after the formation of the second layer 801', the third injector 701 leaves the second molding device 200, and the second upper mold 601 is disengaged and withdrawn from the lower mold 102, as shown in FIG. 13. The third outlet **701*a* is disengaged with the second passage 601*b*. The second molding device 200 is changed from the closed configuration (FIG. 12) to the open configuration (FIG. 13**).

Figure 14A:
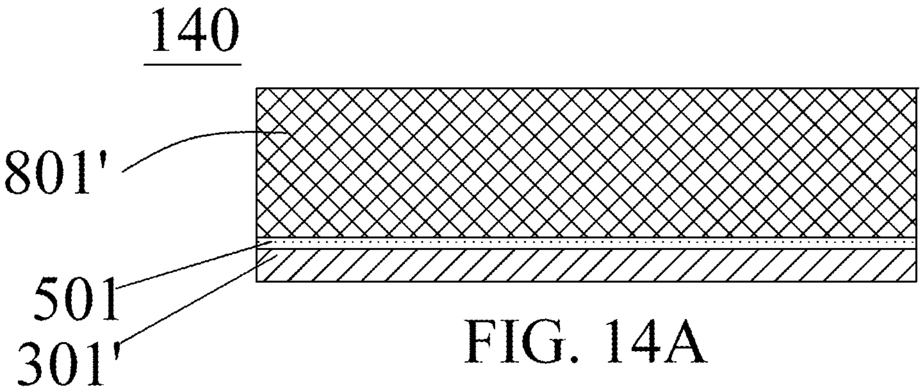
FIGS. 14A-14C are schematic views illustrating exemplary articles in an injection molding method according to one embodiment of the present disclosure.
Figure 14B:
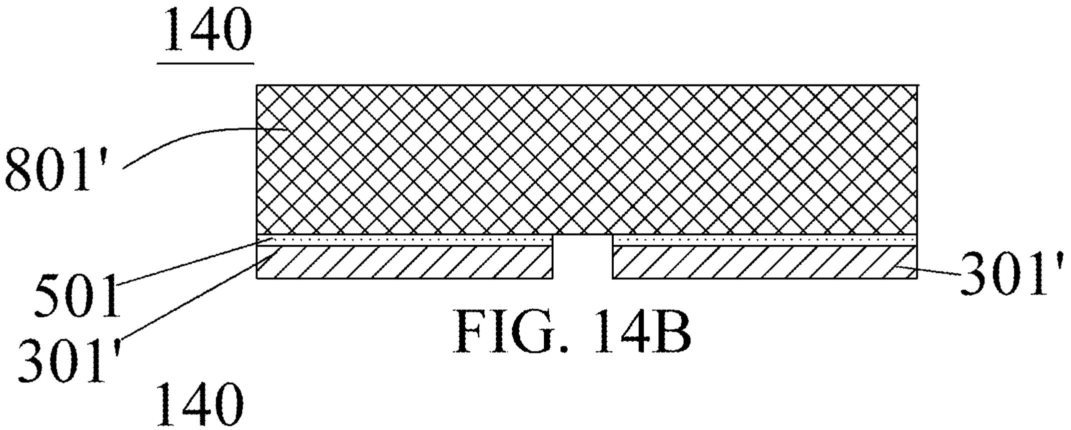
Figure 14C:
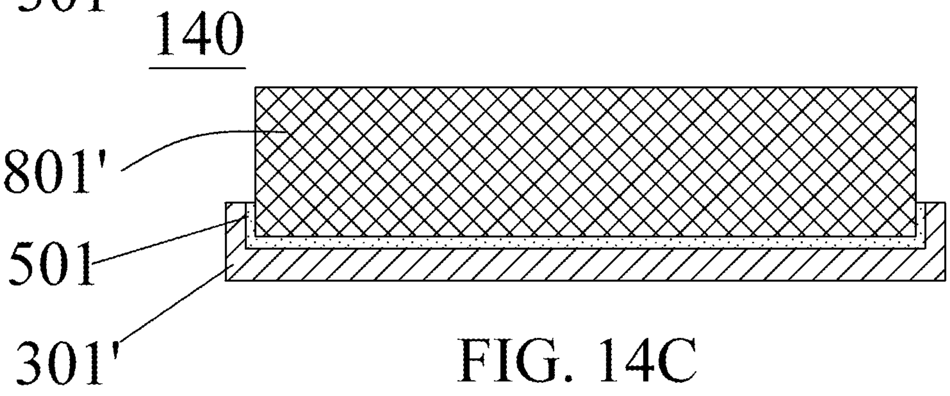

FIGS. 14A to 14C are schematic cross-sectional views illustrating articles manufactured by the method M10 in accordance with some embodiments of the present disclosure. As shown in FIG. 14A, an article 140 at least including the first layer 301' and the second layer 801' is formed. In some embodiments, the article 140 includes a foamed portion (the second layer 801') and a non-foamed portion (the first layer 301'). In some embodiments, after the formation of the article 140, the article 140 is then picked out from the lower mold 102. In some embodiments, the article 140 is picked out manually by human, or automatically by robot, robotic arm, gripper or the like. In some embodiments, the article 140 is a part of a footwear or a semi-product of a footwear. In some embodiments, the first layer 301' is an outsole of the footwear. In some embodiments, the second layer 801' is a midsole of the footwear.

As discussed above, the lower mold 102 may include more than one recess **102*a*, and therefore, more than one first mold cavities 103-1 are present when the first molding device 100 is closed. As such, more than one first layers 301' can be formed as shown in FIG. 14B, and the article 140 may include more than one first layers 301'. Several first layers 301' are attached to the second layer 801' by the adhesive 501**.

In some embodiments, the first material 301 may dispose on bottom and sidewalls of the recess **102*a*. In some embodiments, the first injector 201 may inject the first material 301 on the bottom and the sidewalls of the recess 102*a*. As a result, the first layer 301' surrounding a portion of the second layer 801' is formed as shown in FIG. 14C. Therefore, the article 140 may have the second layer 801' at least partially surrounded by the first layer 301'**.

Since all layers (the first layer 301', the second layer 801', etc.) of the article 140 are fabricated by the same lower mold 102, adhesion between the first layer 301' and the second layer 801' is more secure and improved. Therefore, reliability and quality of the article 140 produced by the above injection molding method M10 is improved or increased.

Figure 15:
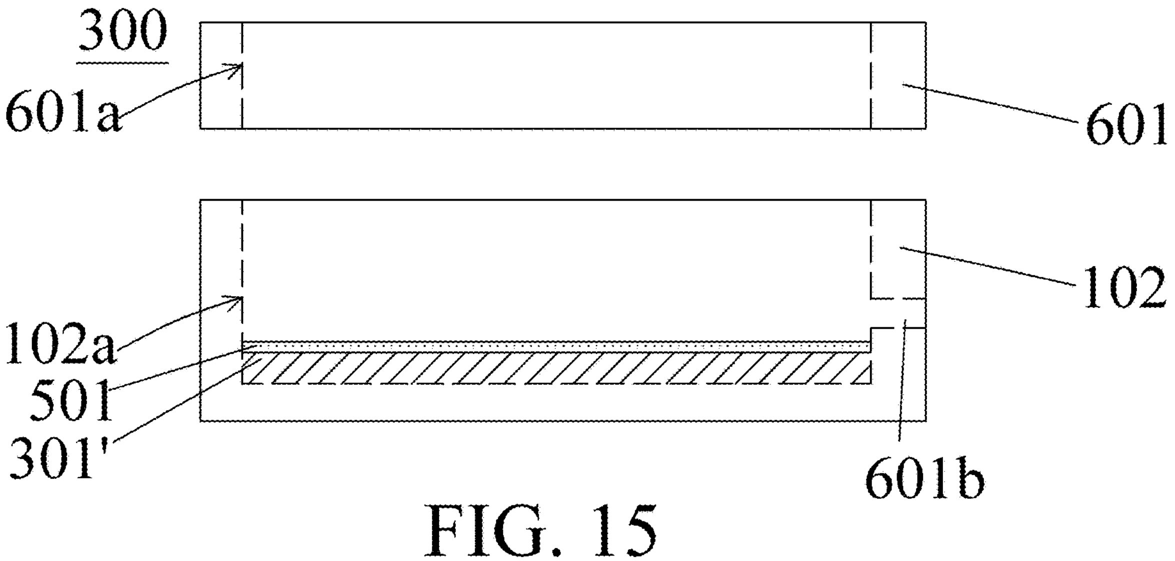
FIGS. 15-17 are schematic cross-sectional views illustrating exemplary operations in an injection molding method according to one embodiment of the present disclosure.
Figure 16:
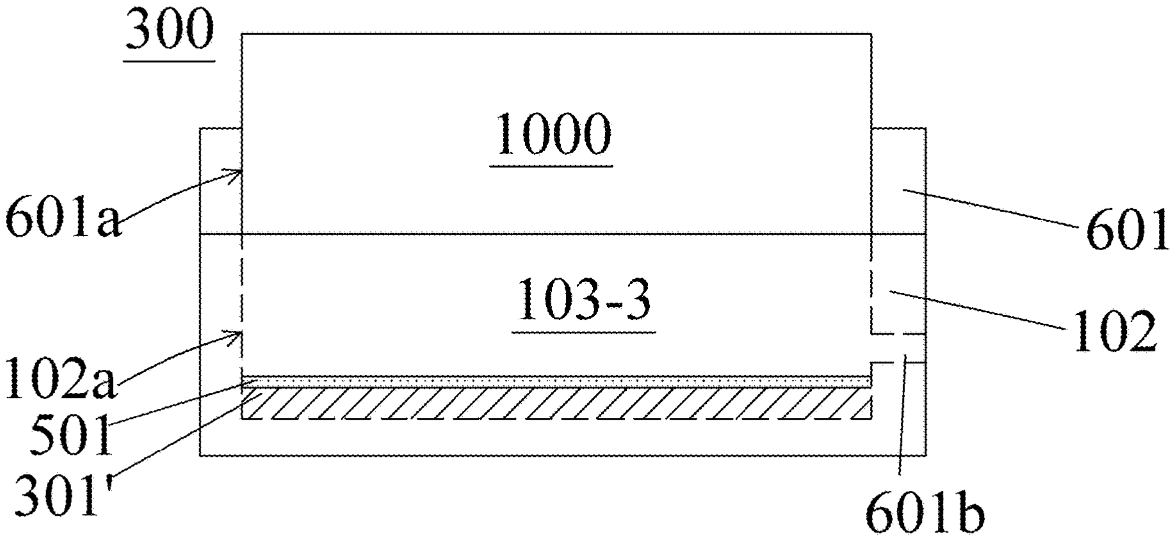
Figure 17:
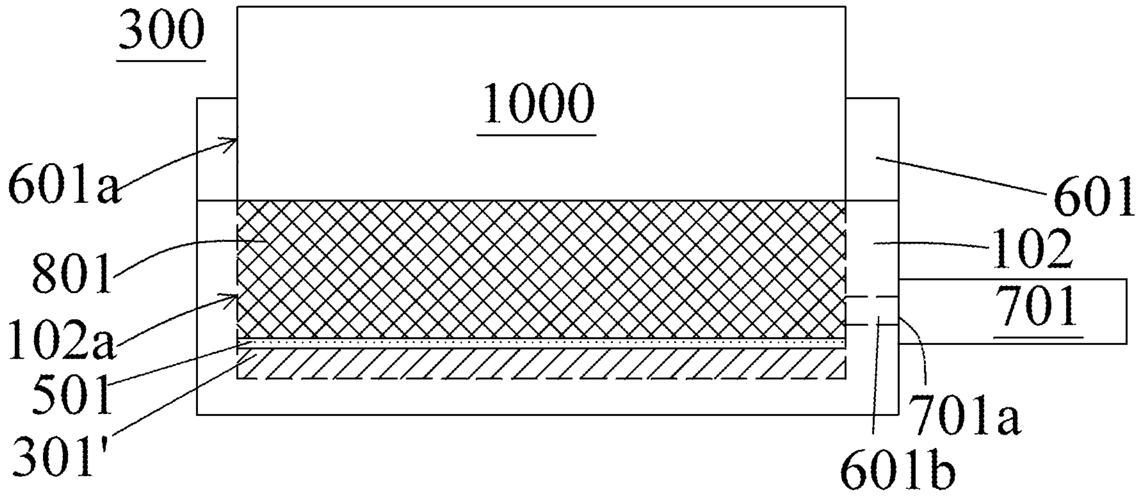
Figure 18:
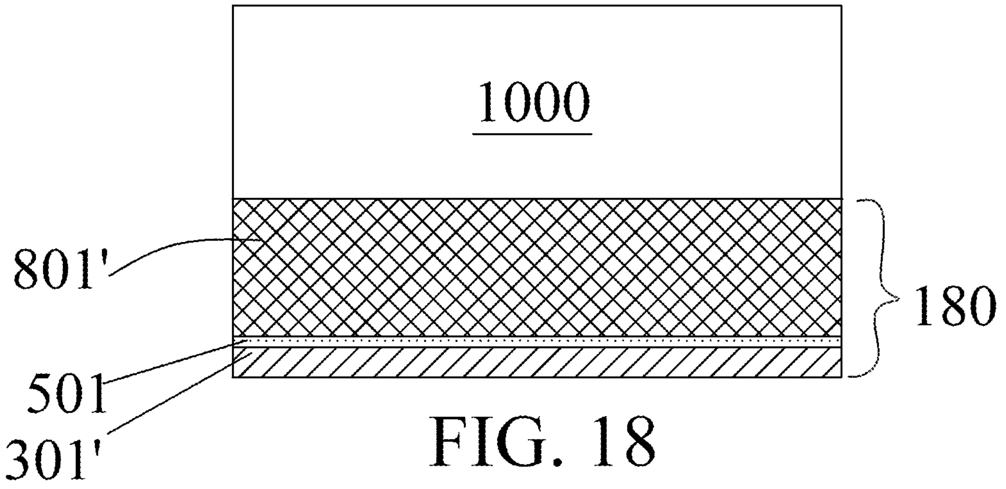
FIG. 18 is a schematic view illustrating exemplary article in an injection molding method according to one embodiment of the present disclosure.

In some embodiments, the injection molding method M10 further includes disposing a component within an opening of the third mold prior to the injection of the second material, wherein the component is attached to and disposed over the foamed layer. FIGS. 15 to 17 are schematic cross-sectional views illustrating a third molding device 300 of the operations O104 to O106 of the method M10 in accordance with some embodiments of the present disclosure. FIG. 18 is a schematic cross-sectional view illustrating an article 180 manufactured by the method M10 in accordance with some embodiments of the present disclosure.

In some embodiments, the second upper mold 601 is in another configuration such that a component 1000 is attached to the article 180 upon formation of the second layer 801', as shown in FIGS. 15-18. In some embodiments, the second upper mold 601 includes an opening **601*a* as shown in FIG. 15, and the component 1000 is receivable by the opening 601*a* as shown in FIG. 16. In some embodiments, the second passage 601*b* is configured at the lower mold 102 as shown in FIGS. 15 and 16, instead of the second upper mold 601. As such, the second material 801 is injected into a third mold cavity 103-3 between the component 1000 and the first material 301 or between the component 1000 and the adhesive 501 as shown in FIG. 17, similar to the step as shown in FIG. 12. The component 1000 is in contact with the second material 801 during formation of the second layer 801'. As such, the component 1000 is attached to the second layer 801' during and after the formation of the second layer 801'. As a result, a product or a semi-product including the component 1000 and the article 180 (including the first layer 301' and the second layer 801') is fabricated as shown in FIG. 18. In some embodiments, the component 1000** is an insole, a footwear upper or any other suitable component of the footwear.

Figure 19:
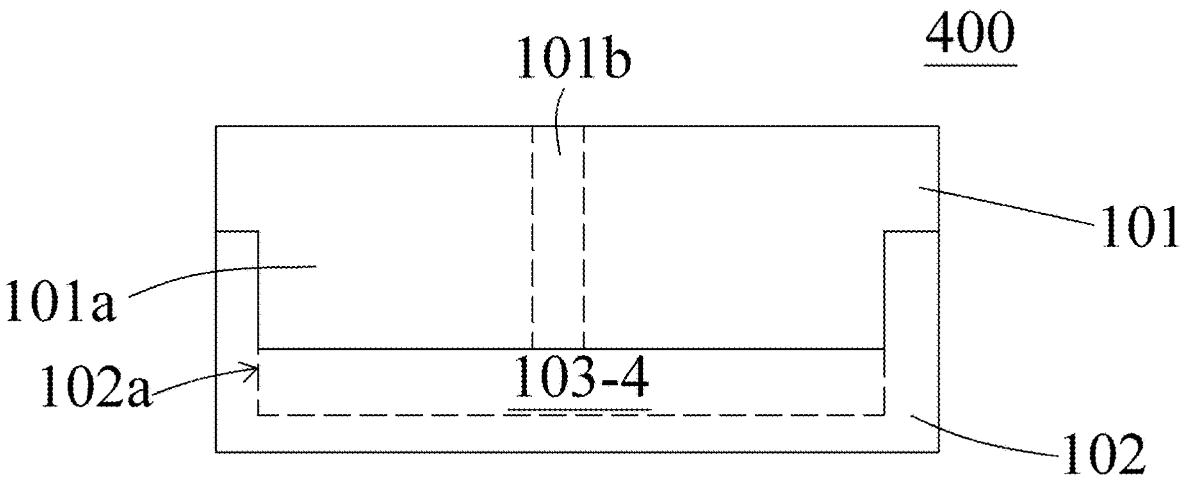
FIGS. 19-22 are schematic cross-sectional views illustrating exemplary operations in an injection molding method according to one embodiment of the present disclosure.

FIGS. 19 to 22 are schematic cross-sectional views illustrating a fourth molding device 400 of the method M10 in accordance with some embodiments of the present disclosure. FIG. 23 is a schematic cross-sectional view illustrating an article 230 manufactured by the method M10 in accordance with some embodiments of the present disclosure. In some embodiments, a fourth molding device 400 is in the closed configuration as shown in FIG. 19, a fourth mold cavity 103-4 is defined by the first upper mold 101 and the lower mold 102. The fourth mold cavity 103-4 is configured to hold material and form the article within a recess **102*a*. The fourth mold cavity 103-4 is communicable with the first passage 101*b*. In some embodiments, the fourth mold cavity 103-4 is sealed when the fourth molding device 400** is closed.

Figure 20:
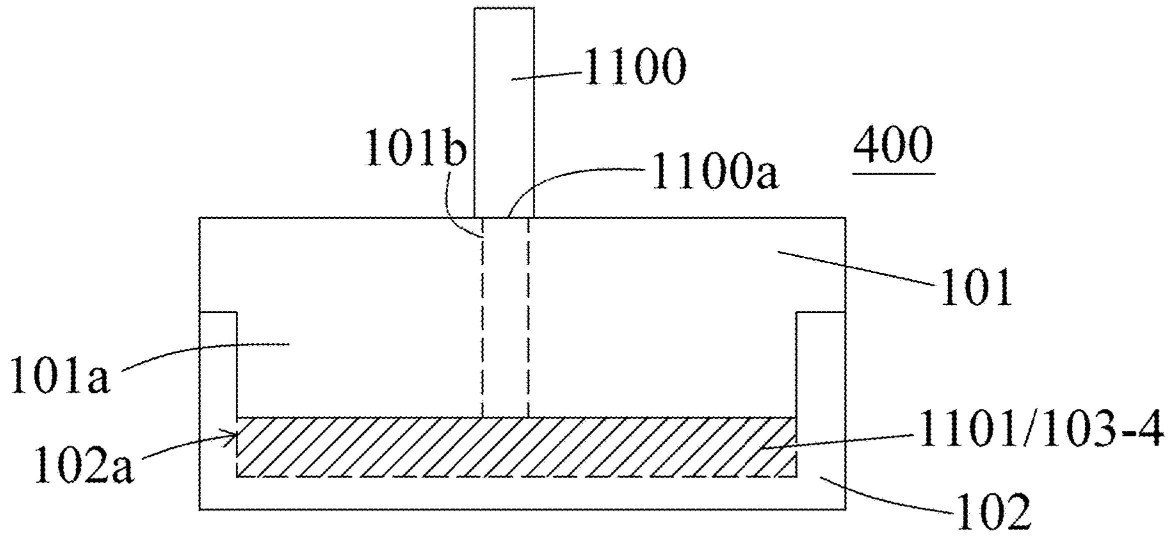
Figure 21:
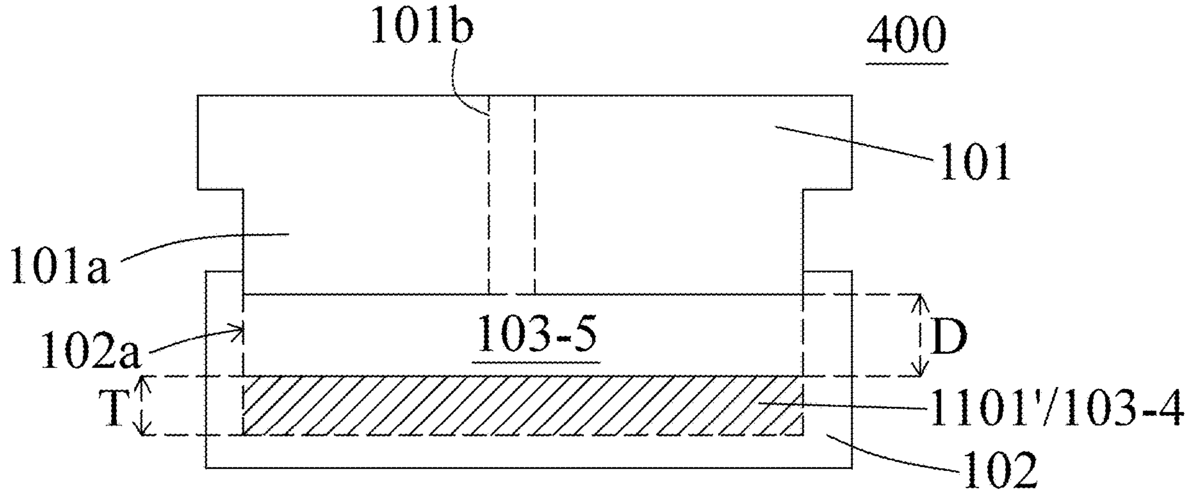

In some embodiments, a third material 1101 is injected into the fourth mold cavity 103-4 through the first passage **101*b* as shown in FIG. 20 when the fourth molding device 400 is closed. In some embodiments, the third material 1101 is injected into the fourth mold cavity 103-4 from a fourth injector 1100 via a fourth outlet 1100*a* of the fourth injector 1100. The third layer 1101' is subsequently formed as shown in FIG. 21**.

In some embodiments, the third material 1101 includes thermoplastic polyurethane (TPU), polyurethane (PU), plastics or any other suitable materials. In some embodiments, the third material 1101 is foamable material or less foamable material. In some embodiments, the third material 1101 is non-foamable material. In some embodiments, the third material 1101 is similar to the first material 301.

In some embodiments, regarding the operation O103, during or after the formation of the third layer 1101', the fourth injector 1100 leaves the fourth molding device 400. Subsequently, the first upper mold 101 is moved away from the lower mold 102 to form a fifth mold cavity 103-5 as shown in FIG. 21. In some embodiments, during or after the injection of the third material 1101 into the fourth mold cavity 103-4, the fourth mold cavity 103-4 is expanded by moving the first upper mold 101 away from the lower mold 102 to form the fifth mold cavity 103-5. In some embodiments, at least a portion of the protrusion 101*a* is disposed in the recess 102*a* when the fifth mold cavity 103-5 is formed. In some embodiments, at least a portion of the protrusion 101*a* is exposed from the lower mold 102 when the fifth mold cavity 103-5 is formed.

In some embodiments, the first upper mold 101 is movable, while the lower mold 102 is stationary. In some embodiments, the lower mold 102 is moved away from the first upper mold 101 to form the fifth mold cavity 103-5. In some embodiments, the lower mold 102 is movable, while the upper mold 101 is stationary. The movement of the first upper mold 101 or the lower mold 102 can adjust a volume of the fifth mold cavity 103-5. In other words, a thickness T of the third layer 1101' subsequently formed is also adjustable.

In some embodiments, the first upper mold 101 is moved away from the lower mold 102 in a first distance D, or the lower mold 102 is moved away from the first upper mold 101 in the first distance D. In some embodiments, the first distance D is different from or same as a thickness T of the third layer 1101'. In some embodiments, the first distance D is substantially greater or less than the thickness T of the third layer 1101'. In some embodiments, a volume of a fifth mold cavity 103-5 is different from or same as a volume of the fourth mold cavity 103-4. In some embodiments, the volume of the fifth mold cavity 103-5 is substantially greater or less than the volume of the fourth mold cavity 103-4. In some embodiments, the volume of the fourth mold cavity 103-4 is different from or same as the volume of the third layer 1101'. In some embodiments, the volume of the fifth mold cavity 103-5 is substantially greater or less than the volume of the third layer 1101'. The fourth molding device 400 is still in the closed configuration.

Figure 22:
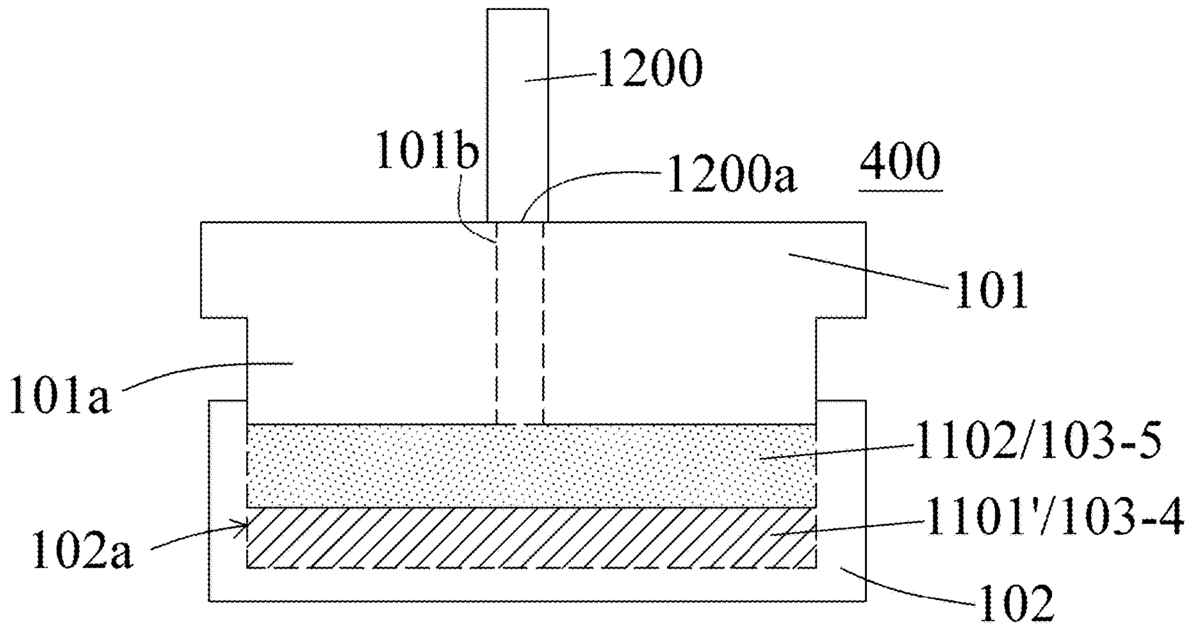
Figure 23:
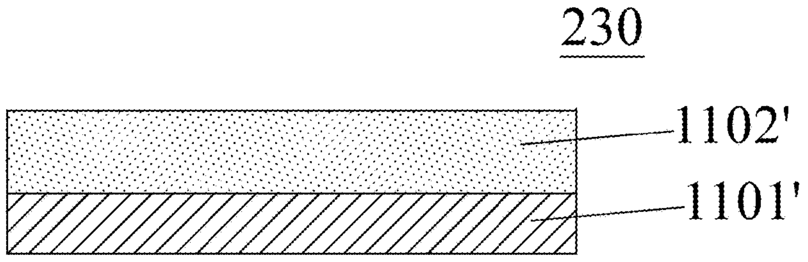
FIG. 23 is a schematic view illustrating exemplary article in an injection molding method according to one embodiment of the present disclosure.

After the formation of the fifth mold cavity 103-5, a fourth material 1102 is injected into the fifth mold cavity 103-5 through the first passage 101*b* as shown in FIG. 22. In some embodiments, the fourth material 1102 is injected into the fifth mold cavity 103-5 from a fifth injector 1200 via a fifth outlet 1200*a*. The fourth layer 1102' is subsequently formed. In some embodiments, the third material 1101 is different from the fourth material 1102. In some embodiments, the third material 1101 and the fourth material 1102 are different from each other in physical properties such as density, foamability, flexibility, hardness, colors, etc.

In some embodiments, the fourth material 1102 includes expanded thermoplastic polyurethane (ETPU), thermoplastic polyurethane (TPU), polyurethane (PU), plastics or any other suitable materials. In some embodiments, the fourth material 1102 is foamable material or highly foamable material. In some embodiments, the fourth material 1102 includes a blowing agent prior to injection from the fifth injector 1200. In some embodiments, a polymeric material is mixed with the blowing agent to become the fourth material 1102 prior to the injection from the fifth injector 1200. In some embodiments, the fourth material 1102 is a mixture of the polymeric material and the blowing agent. In some embodiments, the blowing agent can be any type of physical blowing agent known to those of ordinary skill in the art, such as atmospheric gases (e.g., nitrogen, carbon dioxide), hydrocarbons, chlorofluorocarbons, noble gases, or mixtures thereof. The blowing agent may be supplied in any flowable physical state, for example, a gas, liquid, or supercritical fluid. In some embodiments, the blowing agent is in the supercritical fluid state.

After the formation of the fourth layer 1102', the fifth injector 1200 leaves the fourth molding device 400, and the fourth molding device 400 is changed from the closed configuration to the open configuration. Finally, as shown in FIG. 23, an article 230 at least including the third layer 1101' and the fourth layer 1102' is formed. In some embodiments, after the formation of the article 230, the article 230 is then picked out from the lower mold 102. In some embodiments, the article 230 is picked out manually by human, or automatically by robot, robotic arm, gripper or the like. In some embodiments, the article 230 is a part of a footwear or a semi-product of a footwear. In some embodiments, the third layer 1101' is an outsole of the footwear. In some embodiments, the fourth layer 1102' is a midsole of the footwear. In some embodiments, a density of the third layer 1101' is different from a density of the fourth layer 1102'. In some embodiments, the density of the third layer 1101' is substantially higher than the density of the fourth layer 1102'.

FIGS. 24 to 28 and 30 are schematic cross-sectional views illustrating a fifth molding device 500 of the method M10 in accordance with some embodiments of the present disclosure. FIGS. 29 and 31 are schematic cross-sectional view illustrating articles manufactured by the method M10 in accordance with some embodiments of the present disclosure.

Figure 24:
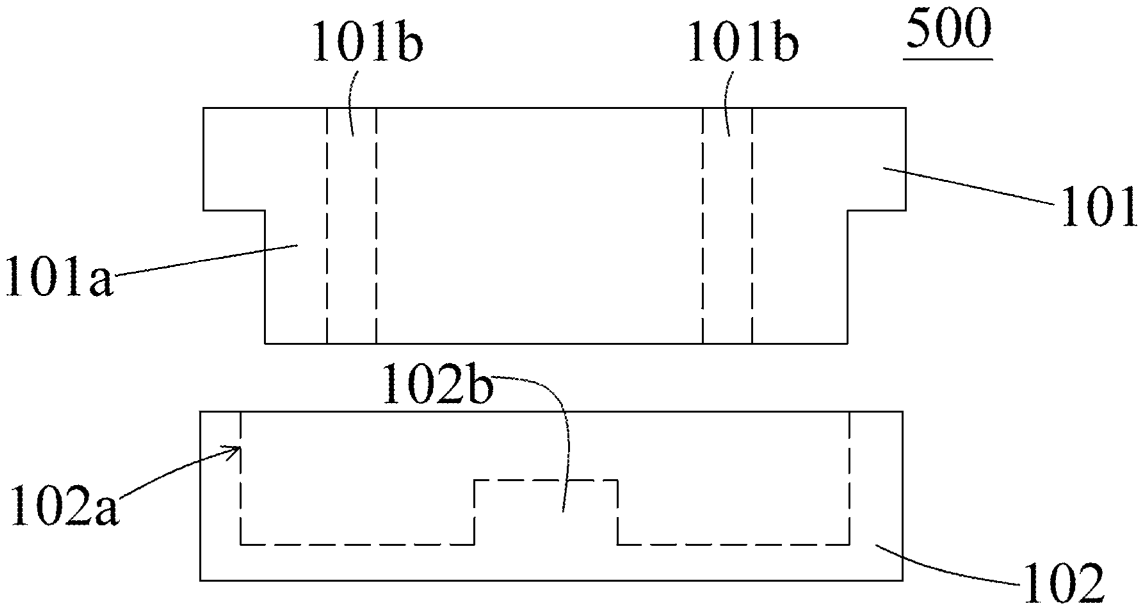
FIGS. 24-28 are schematic cross-sectional views illustrating exemplary operations in an injection molding method according to one embodiment of the present disclosure.
Figure 25:
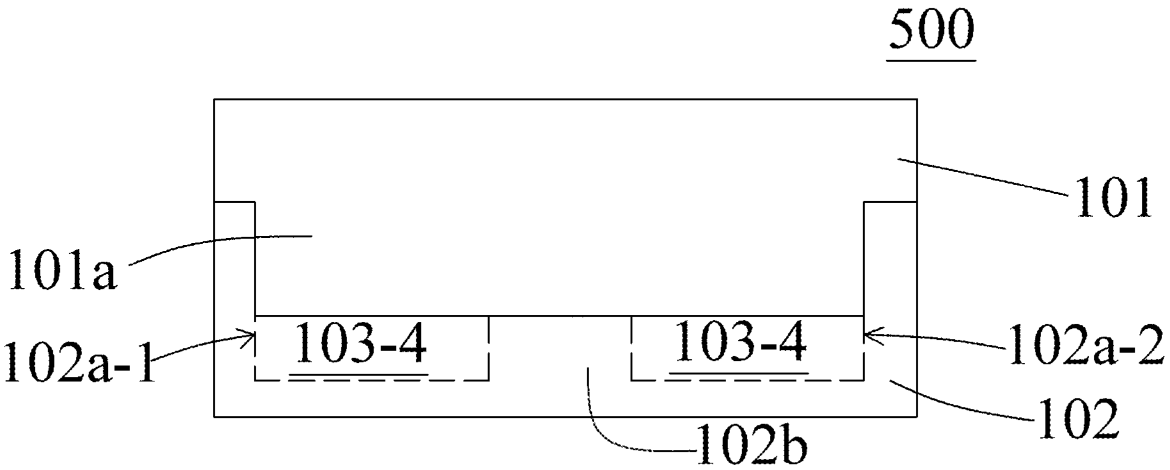
Figure 26:
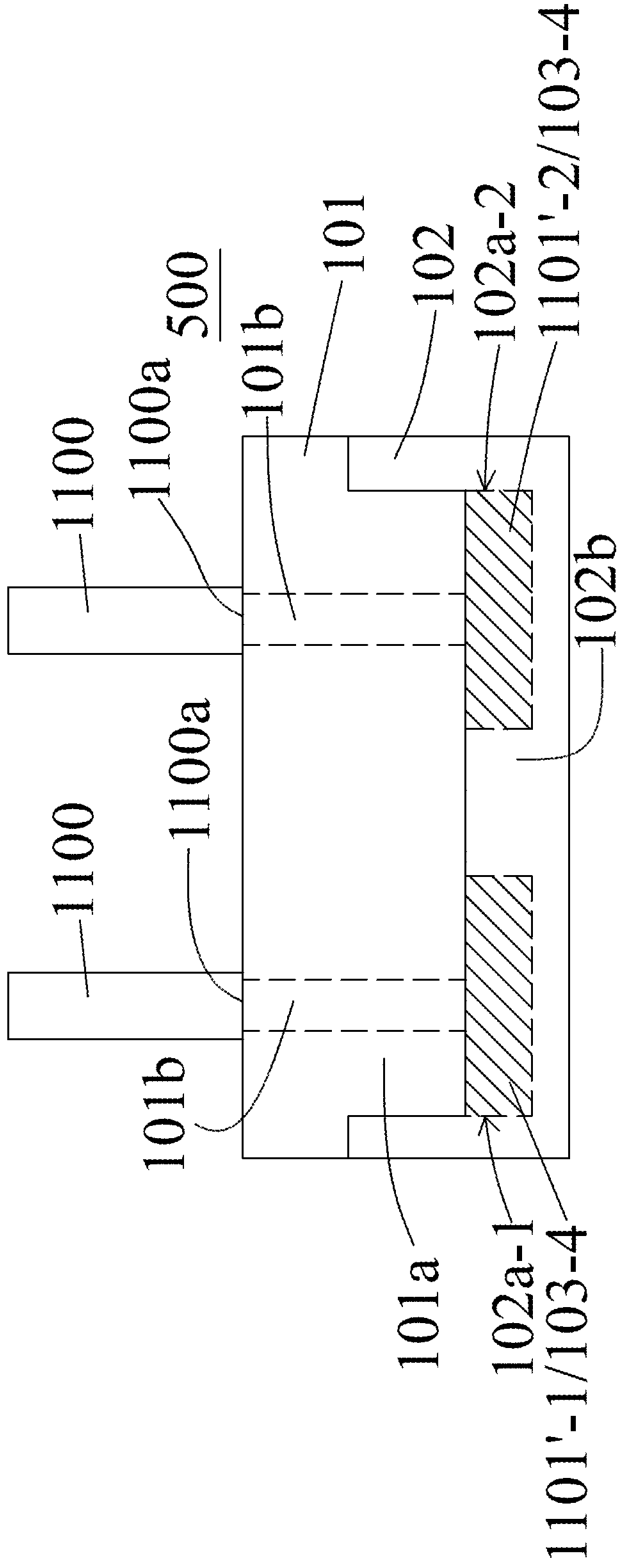

In some embodiments as shown in FIGS. 24-31, instead of formation of layers stacking over each other as shown in FIGS. 19-23, several portions are formed. In some embodiments, the lower mold 102 includes a protrusion 102*b* as shown in FIG. 24, and therefore more than one fourth mold cavities 103-4 can be formed when the fifth molding device 500 is closed as shown in FIG. 25. As a result, the third layer 1101' in more than one portions 1101'-1 and 1101'-2 are formed as shown in FIG. 26. In some embodiments, the protrusion 102*b* is insertable or removable, such that numbers and dimensions of the portions 1101'-1 and 1101'-2 are adjustable depending on numbers and dimensions of the protrusion 102*b* inserted into the lower mold 102. In some embodiments, the portion 1101'-1 and portion 1101'-2 are in similar or different configurations from each other, such as different shapes, physical properties, colors, etc. In some embodiments, volumes of the fourth mold cavities 103-4 can be same or different from each other.

In some embodiments, the portion 1101'-1 and portion 1101'-2 are formed one by one or simultaneously. In some embodiments, the third material 1101 is injected into one side of the lower mold 102 (one of the fourth mold cavity 103-4), and then injected into the other side of the lower mold 102 (the other one of the fourth mold cavity 103-4). In some embodiments, the third material 1101 is injected into the fourth mold cavities 103-4.

Figure 27:
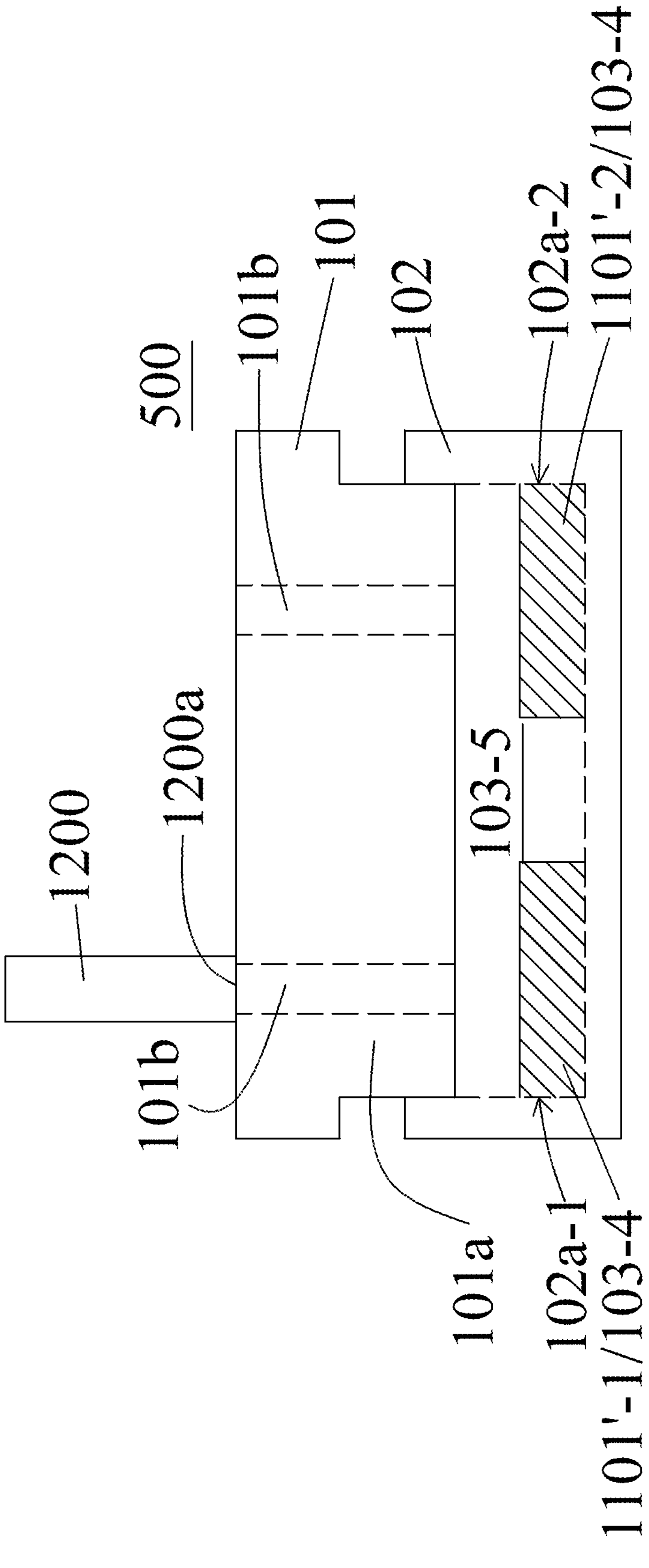

After the formation of the portions 1101'-1 and 1101'-2 as shown in FIG. 26, in some embodiments, the first upper mold 101 is moved away from the lower mold 102 to form the fifth mold cavity 103-5 as shown in FIG. 27, similar to the way described above or illustrated in FIG. 21. In some embodiments, the protrusion 102*b* is removed as shown in FIG. 27, so that the fifth mold cavity 103-5 extends between two portions 1101'-1 and 1101'-2. The fifth molding device 500 is still in the closed configuration.

Figure 28:
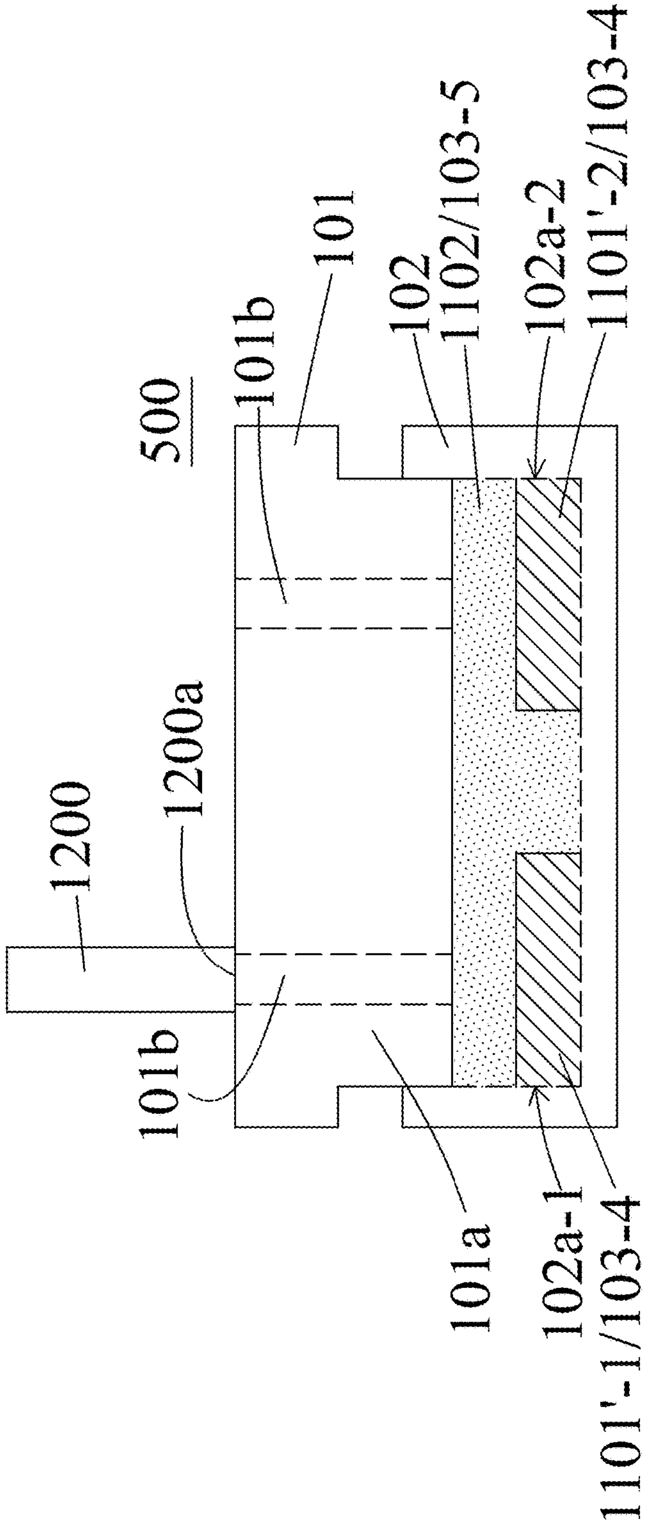
Figure 29:
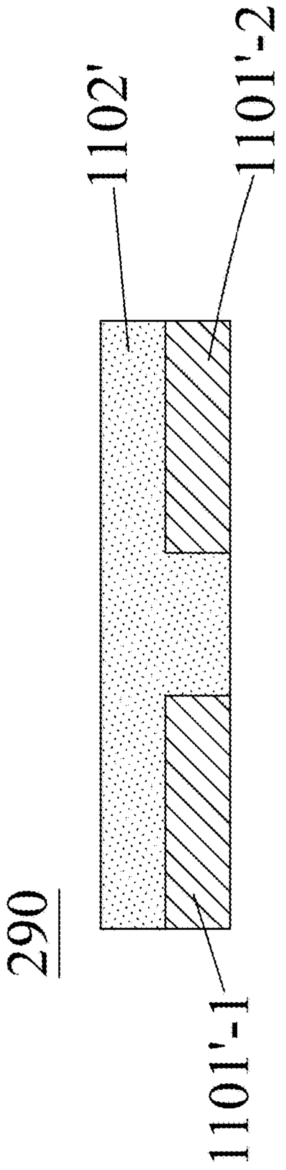
FIG. 29 is a schematic view illustrating exemplary article in an injection molding method according to one embodiment of the present disclosure.

In some embodiments, after the formation of the fifth mold cavity 103-5, the fourth material 1102 is injected into the fifth mold cavity 103-5 as shown in FIG. 28, similar to the way described above or illustrated in FIG. 22. In some embodiments, the fourth material 1102 is disposed between two portions 1101'-1 and 1101'-2 and forms the fourth layer 1102'.

After the formation of the fourth layer 1102', the fifth molding device 500 is changed from the closed configuration to the open configuration. Finally, as shown in FIG. 29, an article 290 at least including portion 1101'-1, portion 1101'-2 and the fourth layer 1102' is formed. In some embodiments, the article 290 is a part of a footwear or a semi-product of a footwear. In some embodiments, the portion 1101'-1 and portion 1101'-2 belongs to an outsole of the footwear. In some embodiments, the fourth layer 1102' is a midsole of the footwear.

Figure 30:
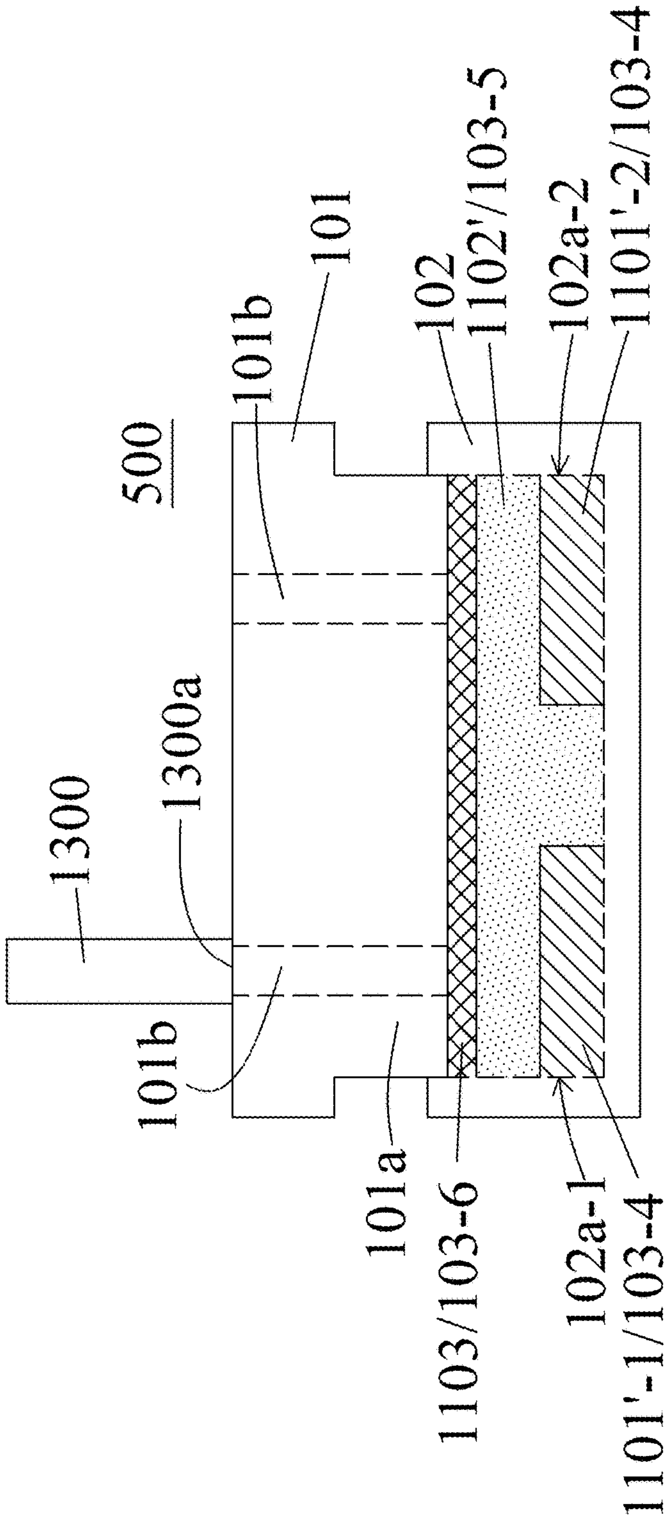
FIG. 30 is a schematic cross-sectional view illustrating exemplary operation in an injection molding method according to one embodiment of the present disclosure.
Figure 31:
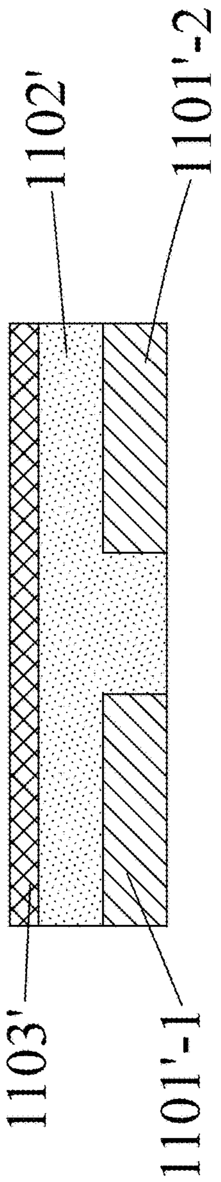
FIG. 31 is a schematic view illustrating exemplary article in an injection molding method according to one embodiment of the present disclosure.

In some embodiments, in operation O102 and/or O105, the steps of injecting materials into the mold cavity described above or illustrated in FIG. 21-22 or 26-27 can be repeated to continue stacking layers/portions as shown in FIGS. 30-31. In some embodiments as shown in FIG. 30, the first upper mold 101 is moved away from the lower mold 102 to form a sixth mold cavity 103-6, and then a fifth material 1103 is injected to the sixth mold cavity 103-6. Finally, a fifth layer 1103' is formed and disposed over the fourth layer 1102' and the portions 1101'-1 and 1101'-2 as shown in FIG. 31. In some embodiments, the fifth material 1103 is injected into the sixth mold cavity 103-6 from a sixth injector 1300 via a sixth outlet 1300*a*. The fifth layer 1103' is subsequently formed. It can be understood that the steps of injecting materials into the mold cavity can be repeated, so that stacked layers/portions can be formed. Numbers of layers/portions are not limited.

Figure 37:
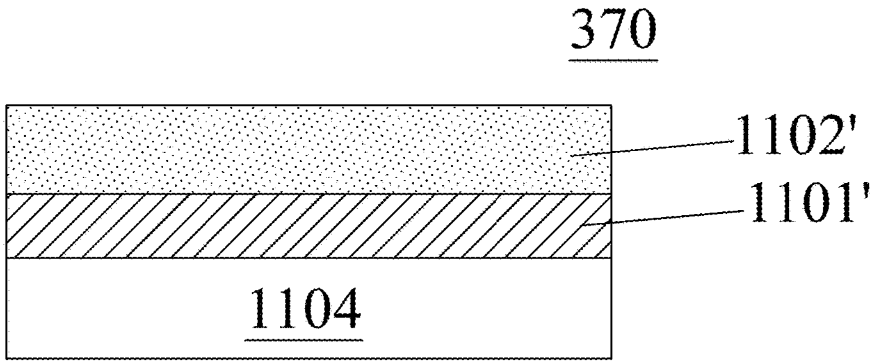
FIG. 37-38 are a schematic views illustrating exemplary articles in an injection molding method according to one embodiment of the present disclosure.
Figure 38:
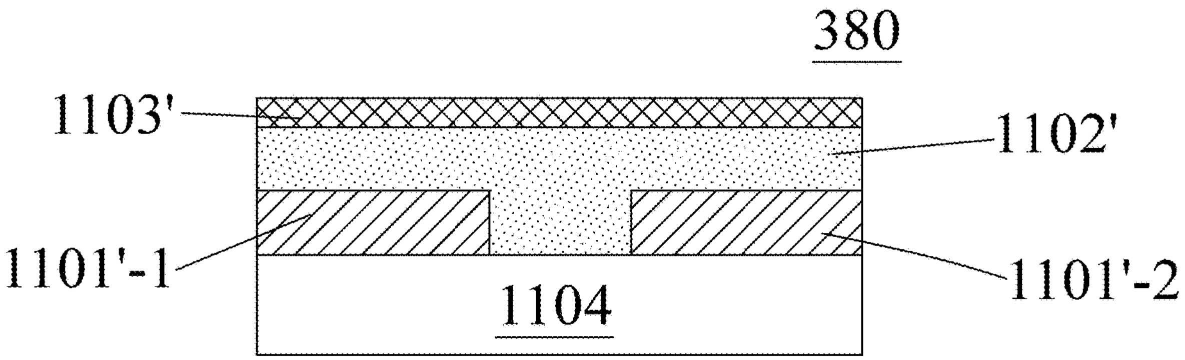

FIGS. 32 to 36 are schematic cross-sectional views illustrating a sixth molding device 600 of the method M10 in accordance with some embodiments of the present disclosure. FIGS. 37-38 are schematic cross-sectional views illustrating articles manufactured by the method M10 in accordance with some embodiments of the present disclosure.

Figure 32:
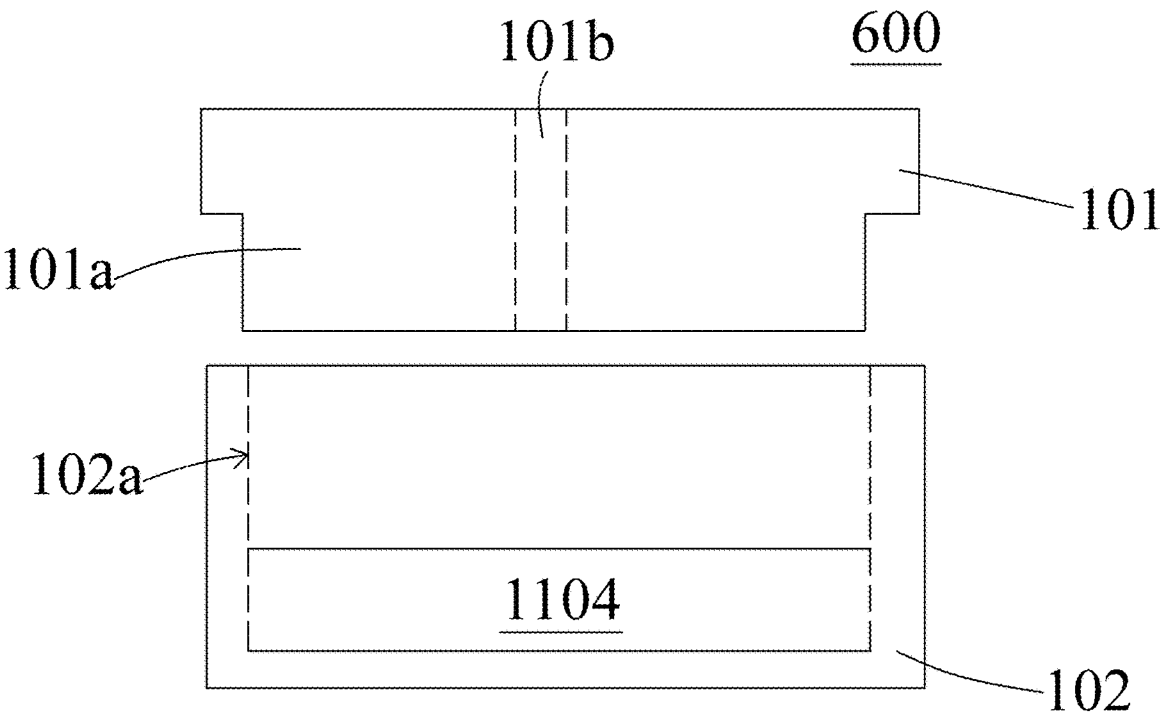
FIGS. 32-36 are schematic cross-sectional views illustrating exemplary operations in an injection molding method according to one embodiment of the present disclosure.

In some embodiments as shown in FIGS. 32-38, a component 1104 is initially formed or placed within the lower mold 102, and then several layers or portions 1101'-1, 1101'-2, 1102' and 1103' are disposed over the component 1104. In some embodiments, the component 1104 is initially formed or placed within the lower mold 102 before performing the operation O102. In some embodiments as shown in FIG. 32, the component 1104 is initially formed or placed. Subsequently, several layers or portions 1101'-1, 1101'-2, 1102' and 1103' are formed and stacked over the component 1104 as shown in FIGS. 33-38. In some embodiments, the component 1104 is an insole, a footwear upper or any other suitable components of the footwear. In some embodiments, the articles 370 and 380 including the component 1104 can be formed as shown in FIGS. 37-38.

Figure 33:
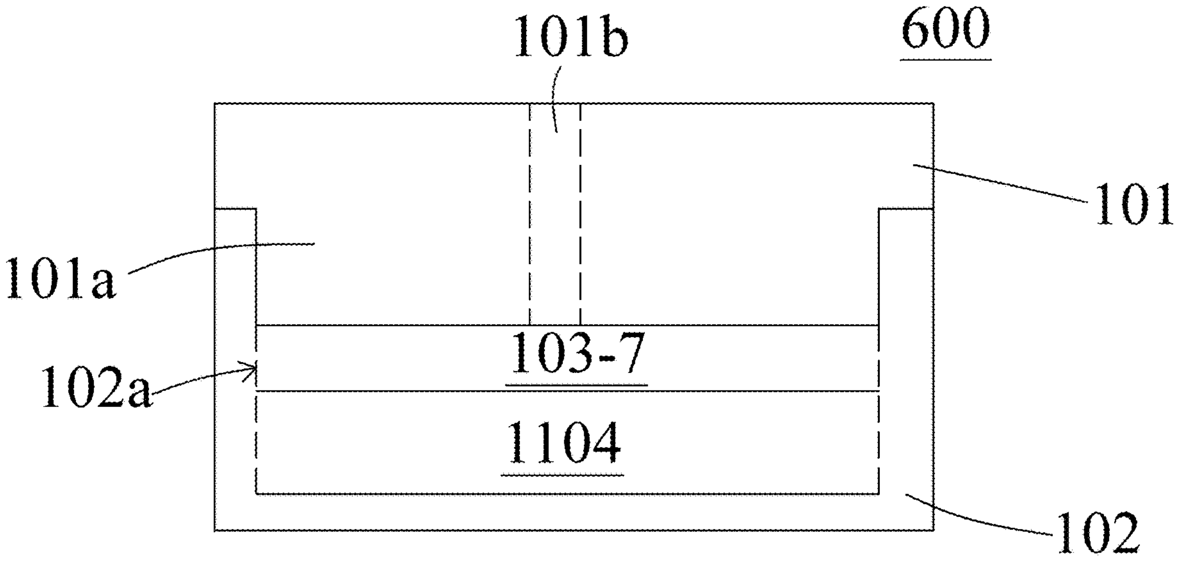

In some embodiments, the molding device 600 is in the closed configuration as shown in FIG. 33, a seventh mold cavity 103-7 is defined by the first upper mold 101, the component 1104 and the lower mold 102. The seven mold cavity 103-7 is configured to hold material and form an article within the recess 102*a*. The seventh mold cavity 103-7 is communicable with the first passage 101*b*. In some embodiments, the seventh mold cavity 103-7 is sealed when the molding device 600 is closed.

Figure 34:
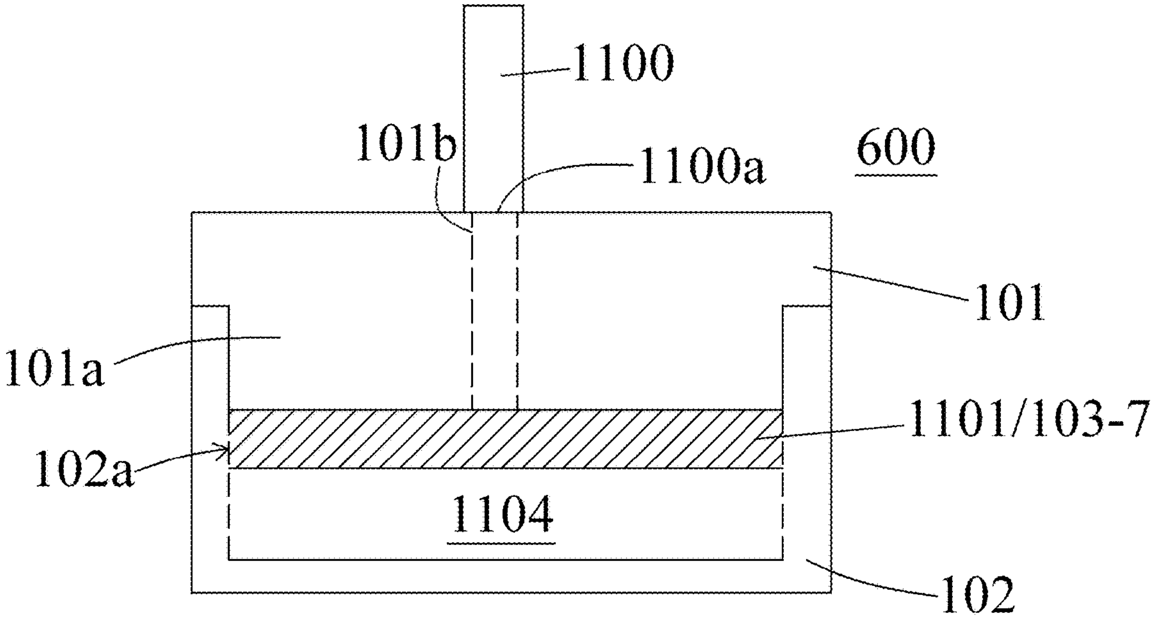
Figure 35:
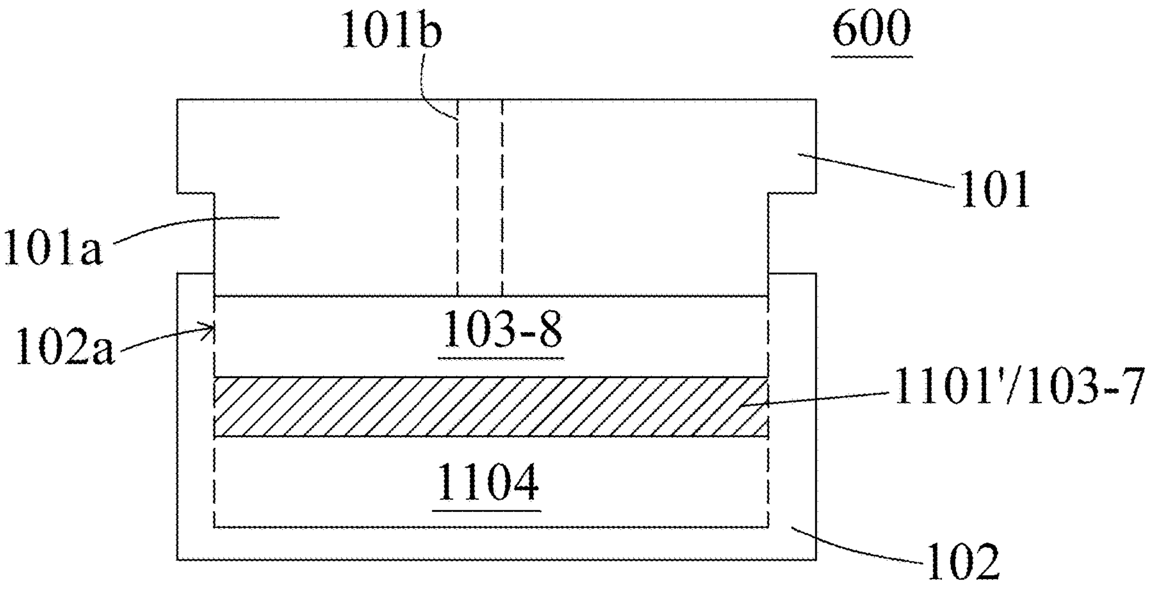

In some embodiments, the third material 1101 is injected into the seventh mold cavity 103-7 through the first passage 101*b* as shown in FIG. 34 when the molding device 600 is closed. In some embodiments, the third material 1101 is injected into the seventh mold cavity 103-7 from the fourth injector 1100 via the fourth outlet 1100*a* of the fourth injector 1100. The third layer 1101' is subsequently formed on the component 1104 as shown in FIG. 35.

In some embodiments, regarding the operation O103, during or after the formation of the third layer 1101', the fourth injector 1100 leaves the molding device 600. Subsequently, the first upper mold 101 is moved away from the lower mold 102 to form an eighth mold cavity 103-8 as shown in FIG. 35. In some embodiments, during or after the injection of the third material 1101 into the seventh mold cavity 103-7, the seventh mold cavity 103-7 is expanded by moving the first upper mold 101 away from the lower mold 102 to form the eighth mold cavity 103-8. In some embodiments, the lower mold 102 is moved away from the first upper mold 101 to form the eighth mold cavity 103-8. The movement of the first upper mold 101 or the lower mold 102 can adjust a volume of the eighth mold cavity 103-8.

In some embodiments, a volume of the eighth mold cavity 103-8 is different from or same as a volume of the seventh mold cavity 103-7. In some embodiments, the volume of the eighth mold cavity 103-8 is substantially greater or less than the volume of the seventh mold cavity 103-7. In some embodiments, the volume of the seventh mold cavity 103-7 is different from or same as the volume of the third layer 1101'. In some embodiments, the volume of the eighth mold cavity 103-8 is substantially greater or less than the volume of the third layer 1101'. The molding device 600 is still in the closed configuration.

Figure 36:
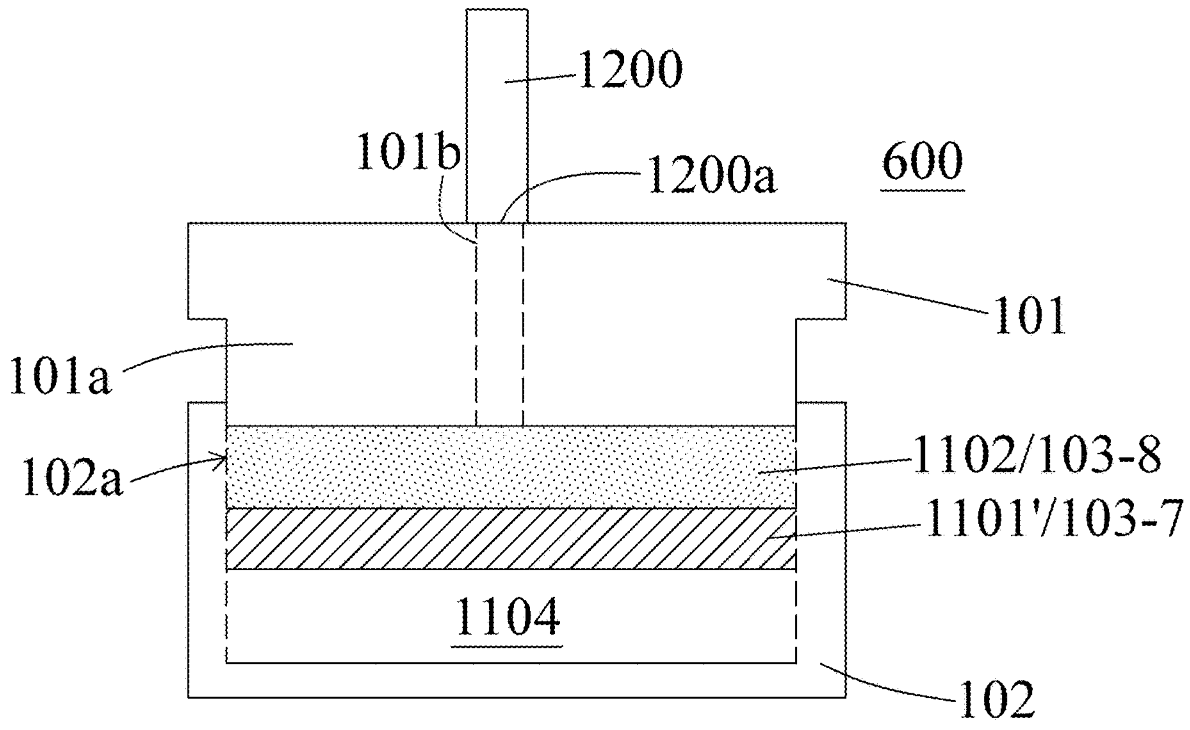

After the formation of the eighth mold cavity 103-8, the fourth material 1102 is injected into the eighth mold cavity 103-8 through the first passage 101*b* as shown in FIG. 36, and the second layer 1102' is subsequently formed. After the formation of the fourth layer 1102', the fifth injector 1200 leaves the molding device 600, and the molding device 600 is changed from the closed configuration to the open configuration.

Finally, as shown in FIG. 37, in some embodiments, an article 370 at least including the component 1104, the third layer 1101' and the fourth layer 1102' is formed. In some embodiments, after the formation of the article 370, the article 370 is then picked out from the lower mold 102. In some embodiments, the article 370 is a footwear or a semi-product of a footwear.

In some embodiments, as shown in FIG. 38, an article 380 at least including the component 1104, the portions 1101'-1, 1101'-2, the fourth layer 1102' and the fifth layer 1103' is formed. In some embodiments, the article 380 is a footwear or a semi-product of a footwear.

Figure 39:
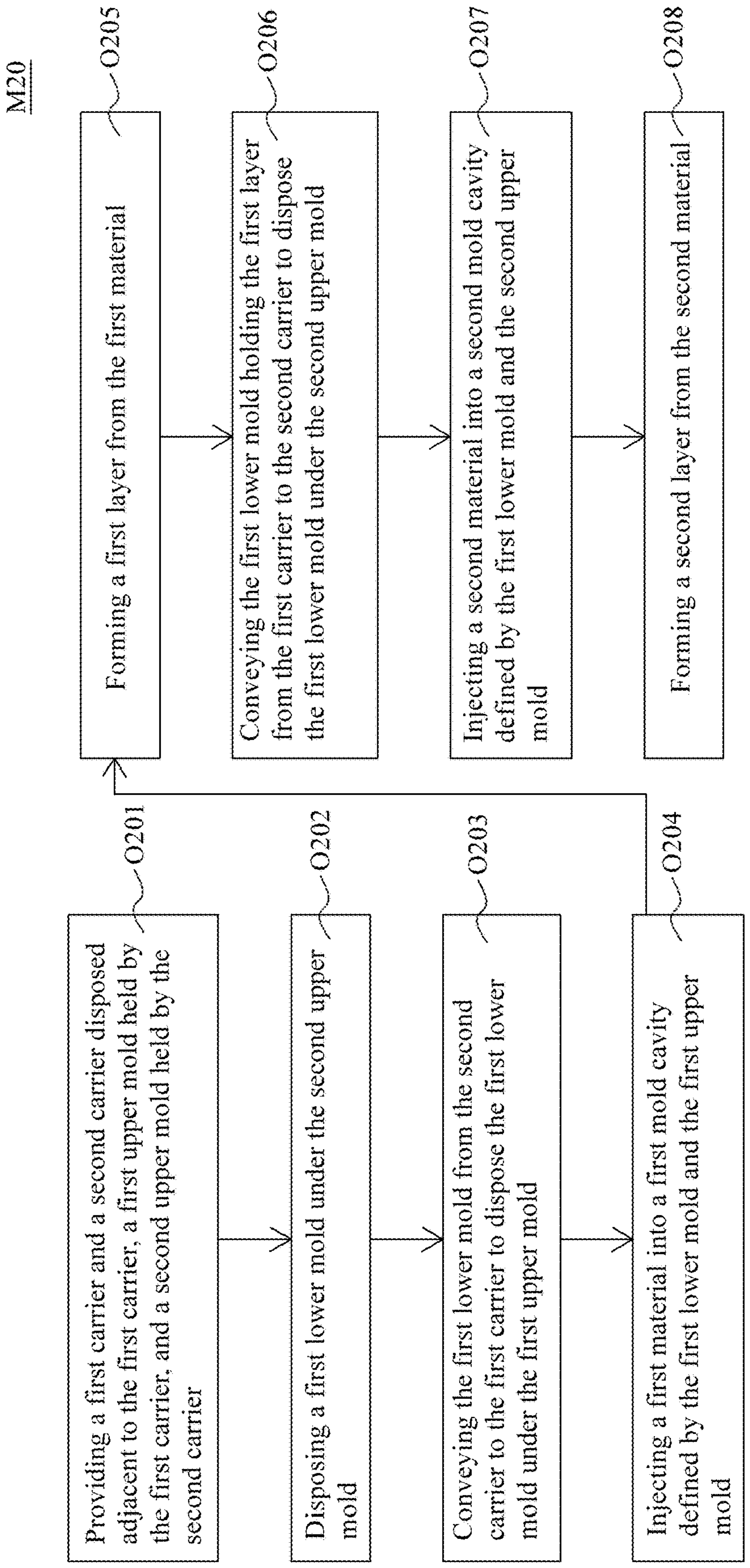
FIG. 39 is a flowchart illustrating an injection molding method according to one embodiment of the present invention.

FIG. 39 is a flowchart showing a method M20 of injection molding method in accordance with some embodiments of the present disclosure. The method M20 includes several operations: (O201) providing a first carrier and a second carrier disposed adjacent to the first carrier, a first upper mold held by the first carrier, and a second upper mold held by the second carrier; (O202) disposing a first lower mold under the second upper mold; (O203) conveying the first lower mold from the second carrier to the first carrier to dispose the first lower mold under the first upper mold; (O205) forming a first layer from the first material; (O206) conveying the first lower mold holding the first layer from the first carrier to the second carrier to dispose the first lower mold under the second upper mold; (O207) injecting a second material into a second mold cavity defined by the first lower mold and the second upper mold; and (O208) forming a second layer from the second material disposed over the first layer.

In order to illustrate concepts and the method M20 of the present disclosure, various embodiments are provided below. However, the present disclosure is not intended to be limited to specific embodiments. In addition, elements, conditions or parameters illustrated in different embodiments can be combined or modified to form different combinations of embodiments as long as the elements, parameters or conditions used are not in conflict. For ease of illustration, reference numerals with similar or same functions and properties are repeated in different embodiments and figures. The various stages of the injection molding method can be in various configurations as shown in any of FIGS. 40 to 52.

FIGS. 40 to 49 are schematic top views illustrating an injection molding system 700. In some embodiments, the injection molding method M10 as described above or illustrated in FIGS. 1-38 is implemented by the injection molding system 700. In some embodiments, the injection molding method M20 is implemented by the injection molding system 700.

Figure 40:
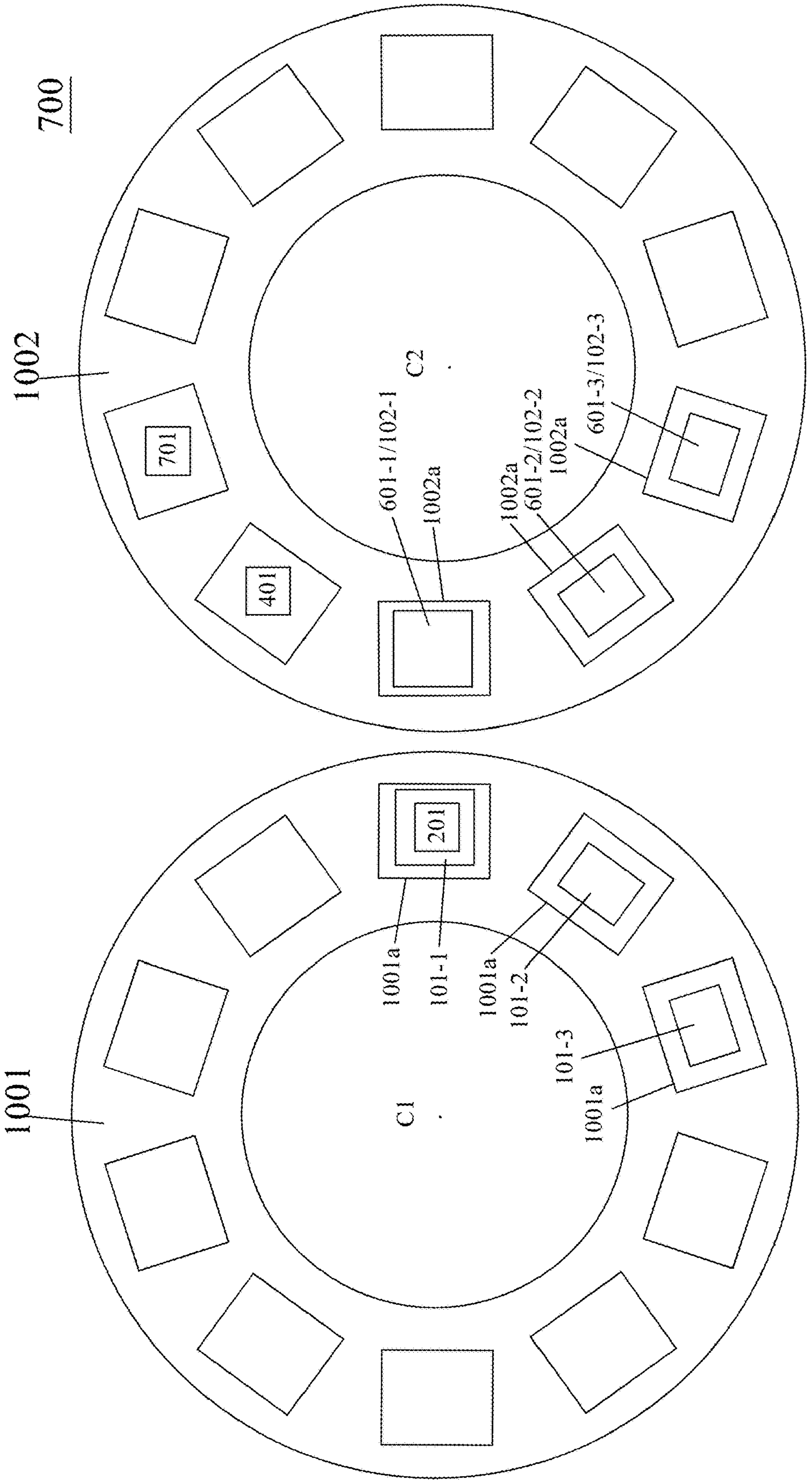
FIGS. 40-52 are schematic views illustrating exemplary operations in an injection molding method according to one embodiment of the present disclosure.

FIG. 40 is a schematic top view illustrating an injection molding system 700 of the operation O201 of the method M20 in accordance with some embodiments of the present disclosure. In some embodiments, the method M20 of injection molding method includes step O201, which includes providing a first carrier 1001 and a second carrier 1002 disposed adjacent to the first carrier 1001, a first upper mold 101-1 held by the first carrier 1001, and a second upper mold 601-1 held by the second carrier 1002.

In some embodiments, the injection molding system 700 includes the first carrier 1001 and the second carrier 1002 disposed adjacent to the first carrier 1001. In some embodiments, the first carrier 1001 and the second carrier 1002 are rotatable about a center C1 of the first carrier 1001 and a center C2 of the second carrier 1002 respectively. In some embodiments, the first carrier 1001 and the second carrier 1002 are in an annular shape. In some embodiments, the first carrier 1001 and the second carrier 1002 are turntables. In some embodiments, the first carrier 1001 is rotatable in a direction same as the second carrier 1002. For example, both the first carrier 1001 and the second carrier 1002 are rotatable in anti-clockwise direction. In some embodiments, the first carrier 1001 is rotatable in a direction opposite to the second carrier 1002. For example, the first carrier 1001 is rotatable in anti-clockwise direction, while the second carrier 1002 is rotatable in clockwise direction, or vice versa. For simplicity and clarity, FIGS. 40-49 show that the first carrier 1001 is operated anti-clockwisely, while the second carrier 1002 is operated clockwisely. However, it can be understood that the first carrier 1001 can be operated in a direction same as or opposite to the second carrier 1002.

In some embodiments, the first carrier 1001 includes several first holders 1001*a* for holding a molding device or a part of the molding device. It is readily understood that the first carrier 1001 can include any suitable number of first holders 1001*a*. In some embodiments, each of the first holders 1001*a* can hold the corresponding first upper mold 101. For example as shown in FIG. 40, three first upper molds 101-1, 101-2 and 101-3 are held by three first holders 1001*a* respectively. In some embodiments, the number of the first holders 1001*a* is more than or equal to the number of the first upper molds 101. In some embodiments, the first upper mold 101 is in configuration similar to the one described above or illustrated in FIGS. 2-7.

In some embodiments, the first injector 201 is disposed over the first carrier 1001. In some embodiments, the first injector 201 is in configuration similar to the one described above or illustrated in FIG. 6. In some embodiments, the first holders 1001*a* pass under the first injector 201 one by one upon rotation of the first carrier 1001. In some embodiments, the first injector 201 is fixedly installed over the first carrier 1001. The first carrier 1001 is movable relative to the first injector 201, and the first injector 201 is stationary relative to the first carrier 1001. In some embodiments, the first injector 201 is configured to inject the first material 301 from the first outlet 201*a* towards the first upper mold 101.

In some embodiments, the second carrier 1002 includes several second holders 1002*a* for holding a molding device or a part of the molding device. It is readily understood that the second carrier 1002 can include any suitable number of second holders 1002*a*. In some embodiments, each of the second holders 1002*a* can hold the corresponding second upper mold 601 and the lower mold 102. For example as shown in FIG. 40, three second upper molds 601-1, 601-2 and 601-3 and three lower molds 102-1, 102-2 and 102-3 are held by three second holders 1002*a* respectively. In some embodiments, the number of the second holders 1002*a* is more than or equal to the number of the second upper molds 601 and the number of the lower molds 102. In some embodiments, the number of the second upper molds 601 is identical to the number of the lower molds 102. In some embodiments, the second upper mold 601 is in configuration similar to the one described above or illustrated in FIGS. 10-13.

In some embodiments, the second injector 401 is disposed over the second carrier 1002. In some embodiments, the second injector 401 is in configuration similar to the one described above or illustrated in FIG. 9. In some embodiments, the second holders 1002*a* pass under the second injector 401 one by one upon rotation of the second carrier 1002. In some embodiments, the second injector 401 is fixedly installed over the second carrier 1002. The second carrier 1002 is movable relative to the second injector 401, and the second injector 401 is stationary relative to the second carrier 1002. In some embodiments, the second injector 401 is configured to dispense the adhesive 501 from the second outlet 401*a* towards the lower mold 102.

In some embodiments, the third injector 701 is disposed over the second carrier 1002. In some embodiments, the third injector 701 is in configuration similar to the one described above or illustrated in FIG. 12. In some embodiments, the second holders 1002*a* pass under the third injector 701 one by one upon rotation of the second carrier 1002. In some embodiments, the third injector 701 is fixedly installed over the second carrier 1002. The second carrier 1002 is movable relative to the third injector 701, and the third injector 701 is stationary relative to the second carrier 1002. In some embodiments, the third injector 701 is configured to inject the second material 801 from the third outlet 701*a* towards the lower mold 102. In some embodiments, the third outlet 701*a* of the third injector 701 is extendable towards or retractable away from the lower mold 102.

Initially, as shown in FIG. 40, the method M20 includes operation O201, which includes providing a first carrier 1001 and a second carrier 1002 disposed adjacent to the first carrier, a first upper mold 101-1 held by the first carrier 1001, and a second upper mold 601-1 held by the second carrier 1002. Further, the method M20 includes operation O202, which includes disposing the first lower mold 102-1 under the second upper mold 601. For simplicity and clarity, only three first upper molds 101-1, 101-2, 101-3 are held by the first holder 1001*a*, and three second upper molds 601-1, 601-2, 601-3 and three lower molds 102-1, 102-2, 102-3 are held by the second holder 1002*a*. In some embodiments, the lower molds 102-1, 102-2 and 102-3 are disposed under the second upper molds 601-1, 601-2 and 601-3 correspondingly. It can be understood that each first holder 1001*a* can hold one first upper mold 101, and each second holder 1002*a* can hold one second upper mold 601 and one lower mold 102.

Figure 41:
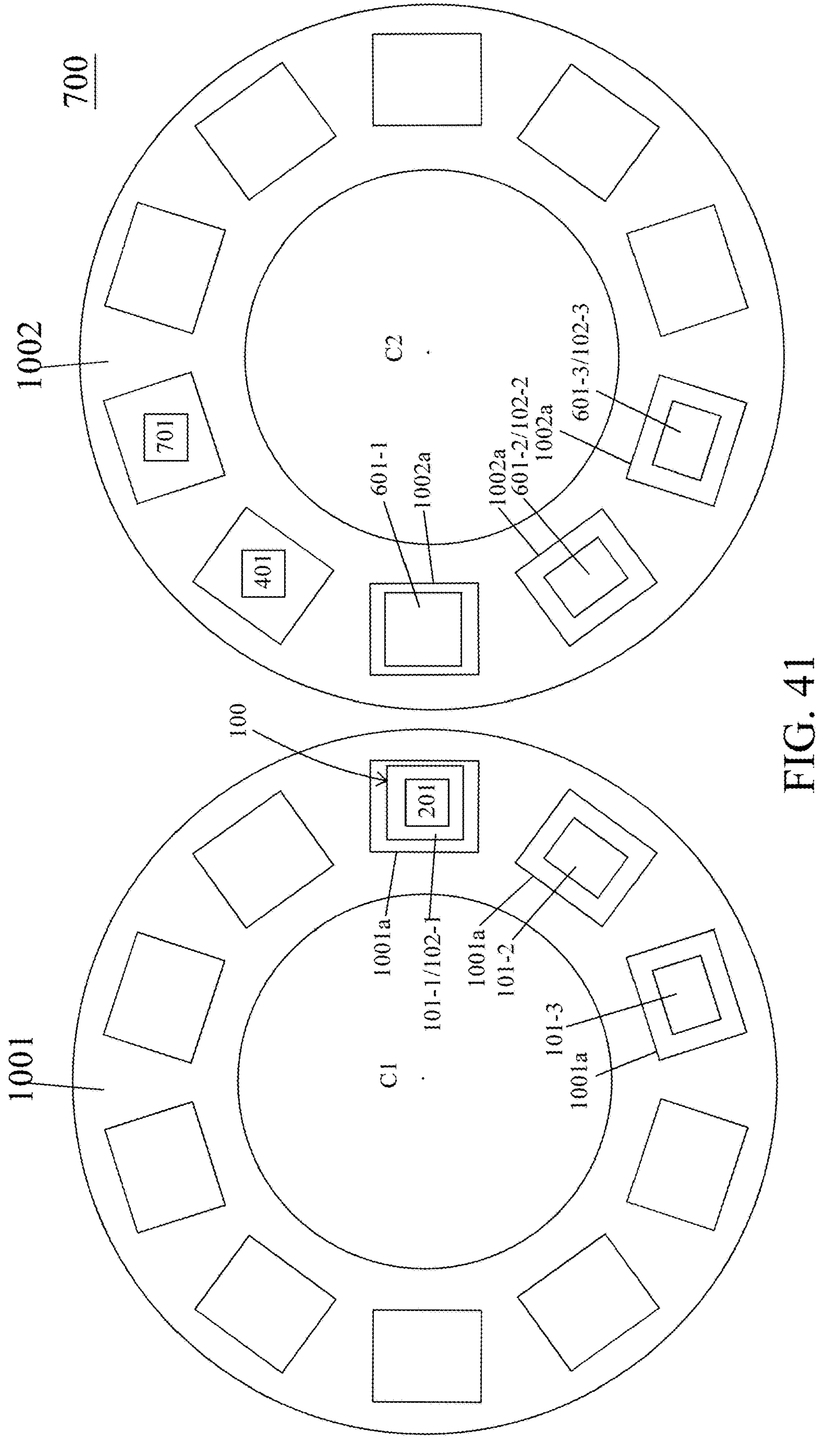

Subsequently, as shown in FIG. 41, in some embodiments, the method M20 includes operation O203, which includes conveying the first lower mold 102-1 from the second carrier 1002 to the first carrier 1001 to dispose the first lower mold 102-1 under the first upper mold 101-1. In some embodiments, the lower mold 102-1 disposed opposite to the first injector 201 is conveyed to the first holder 1001*a* under the first injector 201. In some embodiments, the lower mold 102-1 is conveyed from the second holder 1002*a* to the first holder 1001*a* disposed opposite to the second holder 1002*a* by a conveying mechanism such as rollers, conveying belts or the like. In some embodiments the second holder 1002*a* holding the lower mold 102-1 is aligned with the first holder 1001*a* holding the first upper mold 101-1 during the conveying of the lower mold 102-1.

After the conveying of the lower mold 102-1 from the second holder 1002*a* to the first holder 1001*a*, the first molding device 100 now refers to the first upper mold 101-1 and the first lower mold 102-1. The first molding device 100 is in configuration as described above or illustrated in FIG. 2-3 or 4-5. After the conveying of the lower mold 102-1 from the second holder 1002*a* to the first holder 1001*a*, the first upper mold 101-1 at the first holder 1001*a* is engaged with the lower mold 102-1. As such, the first molding device 100 is changed from the open configuration to the closed configuration, similar to the way described above or illustrated in FIG. 2-3 or 4-5.

In some embodiments, the method M20 includes operation O204, which includes injecting a first material 301 into a first mold cavity 103-1 defined by the first lower mold 102-1 and the first upper mold 101-1. In some embodiments, during or after the closing of the first molding device 100, the first material 301 is injected towards the lower mold 102-1 into the first mold cavity 103-1 from the first injector 201 via a first outlet 201*a* of the first injector 201, similar to the way described above or illustrated in FIG. 3. In some embodiments, the first material 301 is non-foamable material.

The method M20 includes operation O205, which includes forming a first layer from the first material 301. During or after injecting the first material 301, an external force is applied over the first upper mold 101-1 or the lower mold 102-1 to press the first material 301. In some embodiments, a duration for formation of the first layer 301' (total time of injecting the first material 301, cooling of the first material 301, forming of the first layer 301') is less than or equal to 60 seconds. As a result, a first layer 301' including the first material 301 is formed within the lower mold 102-1, similar to the way described above or illustrated in FIG. 6. After the formation of the first layer 301', the first injector 201 leaves the first molding device 100, and the first upper mold 101-1 is disengaged and withdrawn from the lower mold 102-1, similar to the way described above or illustrated in FIG. 6. The first molding device 100 is changed from the closed configuration (FIG. 3) to the open configuration (FIG. 6).

Figure 42:
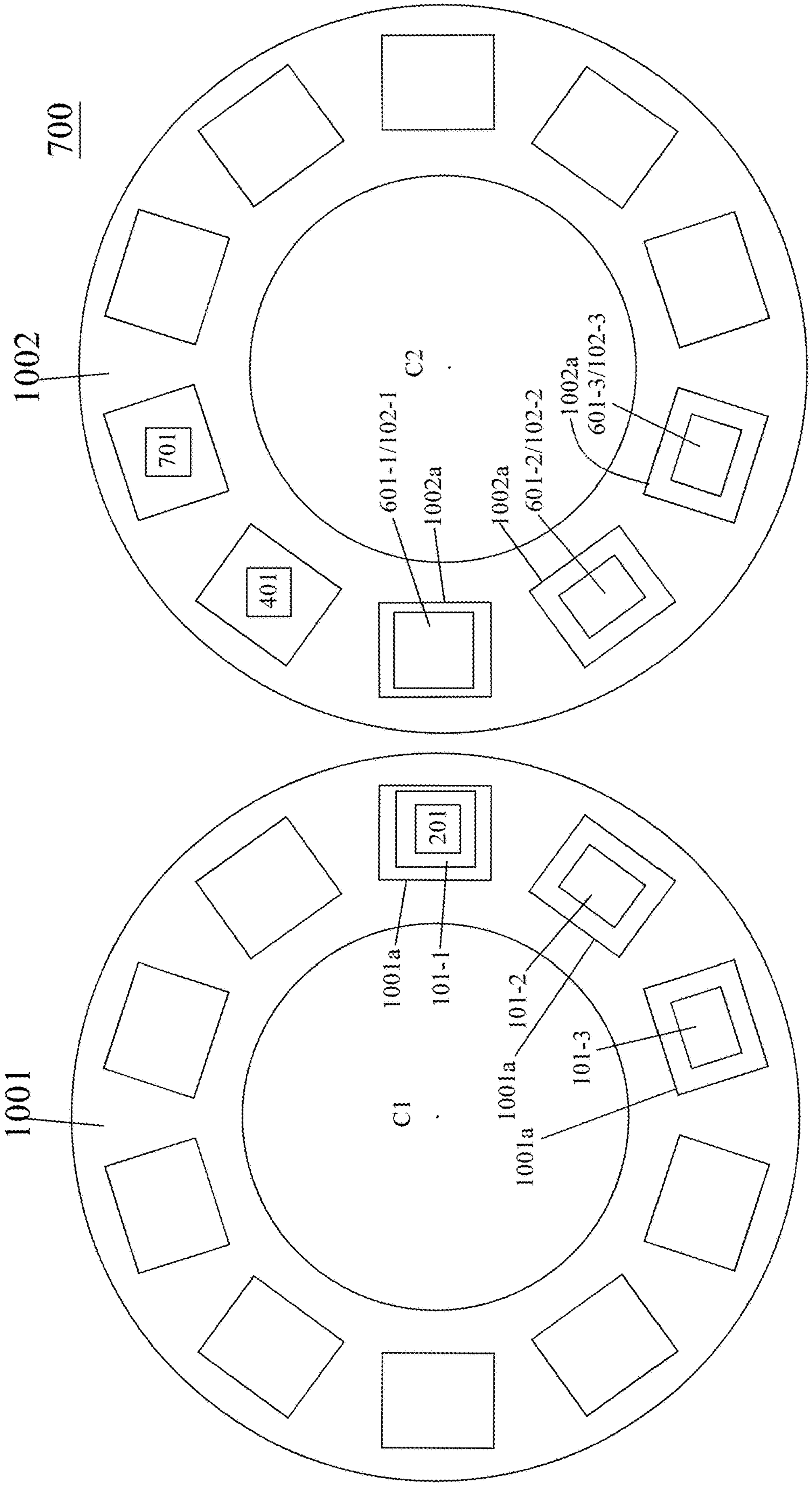

The method M20 includes operation O206, which includes conveying the first lower mold 102-1 holding the first layer 301' from the first carrier 1001 to the second carrier 1002 to dispose the first lower mold 102-1 under the second upper mold 601-1. In some embodiments, the lower mold 102-1 is conveyed from the first carrier 1001 to the second carrier 1002 after the opening of the first molding device 100, as shown in FIG. 42. The lower mold 102-1 is conveyed from the first holder 1001*a* back to the second holder 1002*a* of the second carrier 1002 opposite to the first holder 1001*a*. In some embodiments, the lower mold 102-1 is returned to the second carrier 1002 by a conveying mechanism such as rollers, conveying belts or the like. In some embodiments, the lower mold 102 is conveyed in a suitable speed or by a suitable force, such that the vibration of the lower mold 102 during the conveying is minimized or even prevented.

Figure 43:
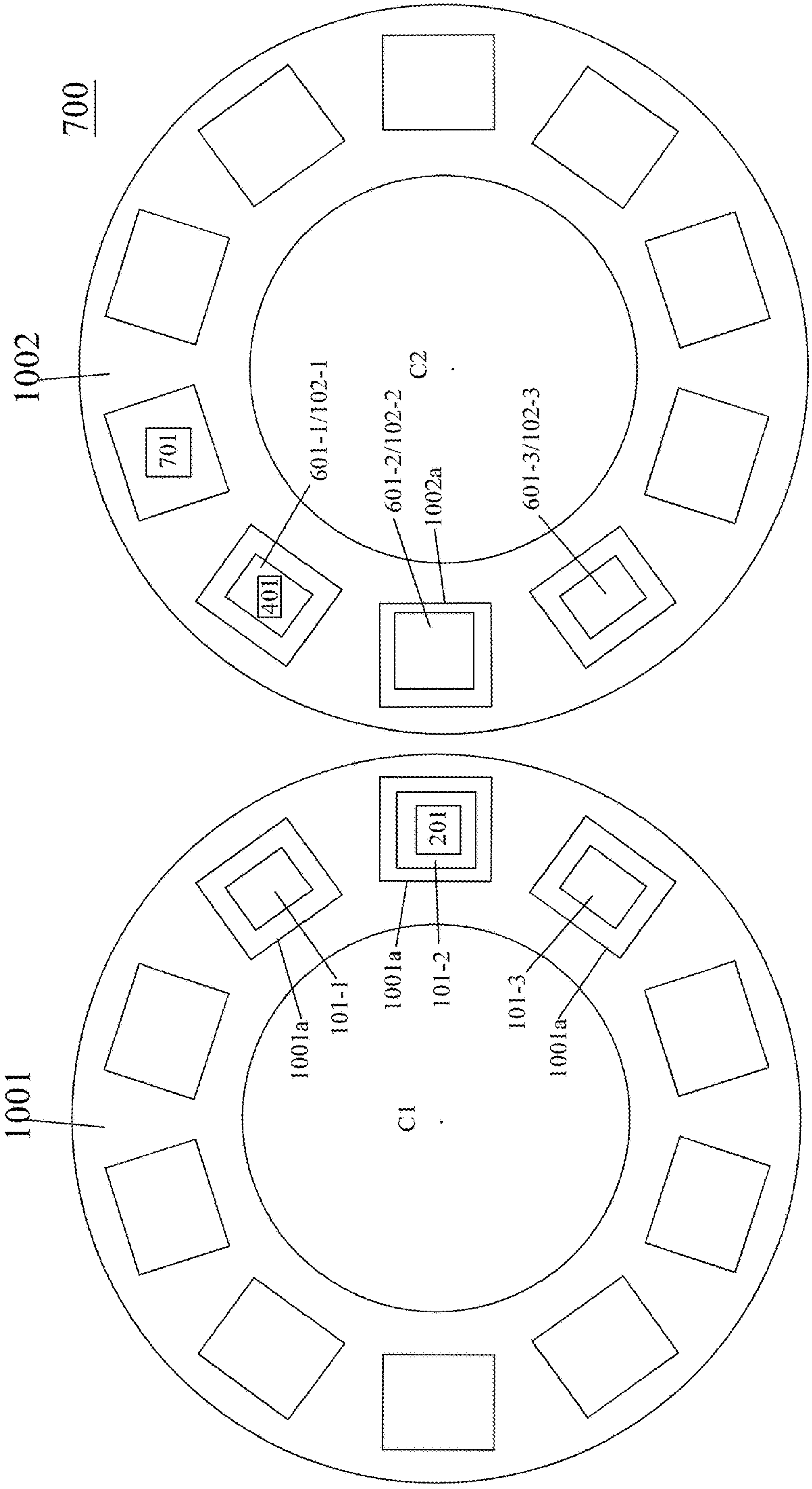

After the conveying the lower mold 102-1 back to the second holder 1002*a*, the first carrier 1001 and the second carrier 1002 are rotated as shown in FIG. 43. In some embodiments, the first carrier 1001 is rotated anti-clockwisely and the second carrier 1002 is rotated clockwisely. In some embodiments, the rotation of the first carrier 1001 results in the first upper mold 101-1 moving away from the first injector 201 and the first upper mold 101-2 moving towards the first injector 201. The rotation of the second carrier 1002 results in the second upper mold 601-1 and the lower mold 102-1 moving towards the second injector 401 or the third injector 701. After the rotation of the first carrier 1001 and the second carrier 1002, the first upper mold 101-2 is disposed opposite to the second upper mold 601-2 and the second lower mold 102-2.

In some embodiments, the first carrier 1001 is rotated in a predetermined interval, such as an angular distance between adjacent first holders 1001*a*. In some embodiments, the second carrier 1002 is rotated in a predetermined interval, such as an angular distance between adjacent second holders 1002*a*. In some embodiments, the first carrier 1001 and the second carrier 1002 are rotated simultaneously and in the same interval. In some embodiments, the first carrier 1001 and the second carrier 1002 are rotated in different speed.

Figure 44:
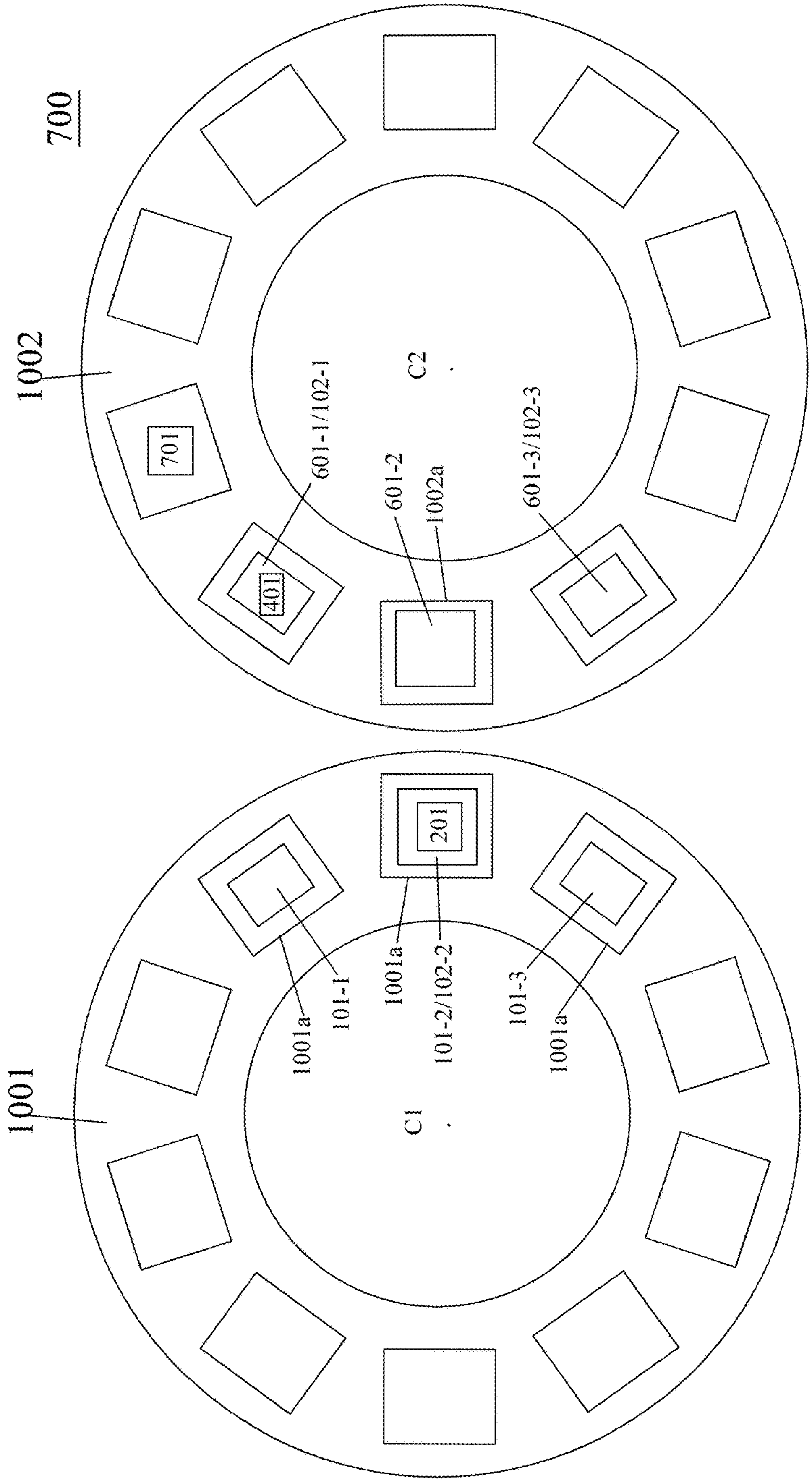
Figure 45:
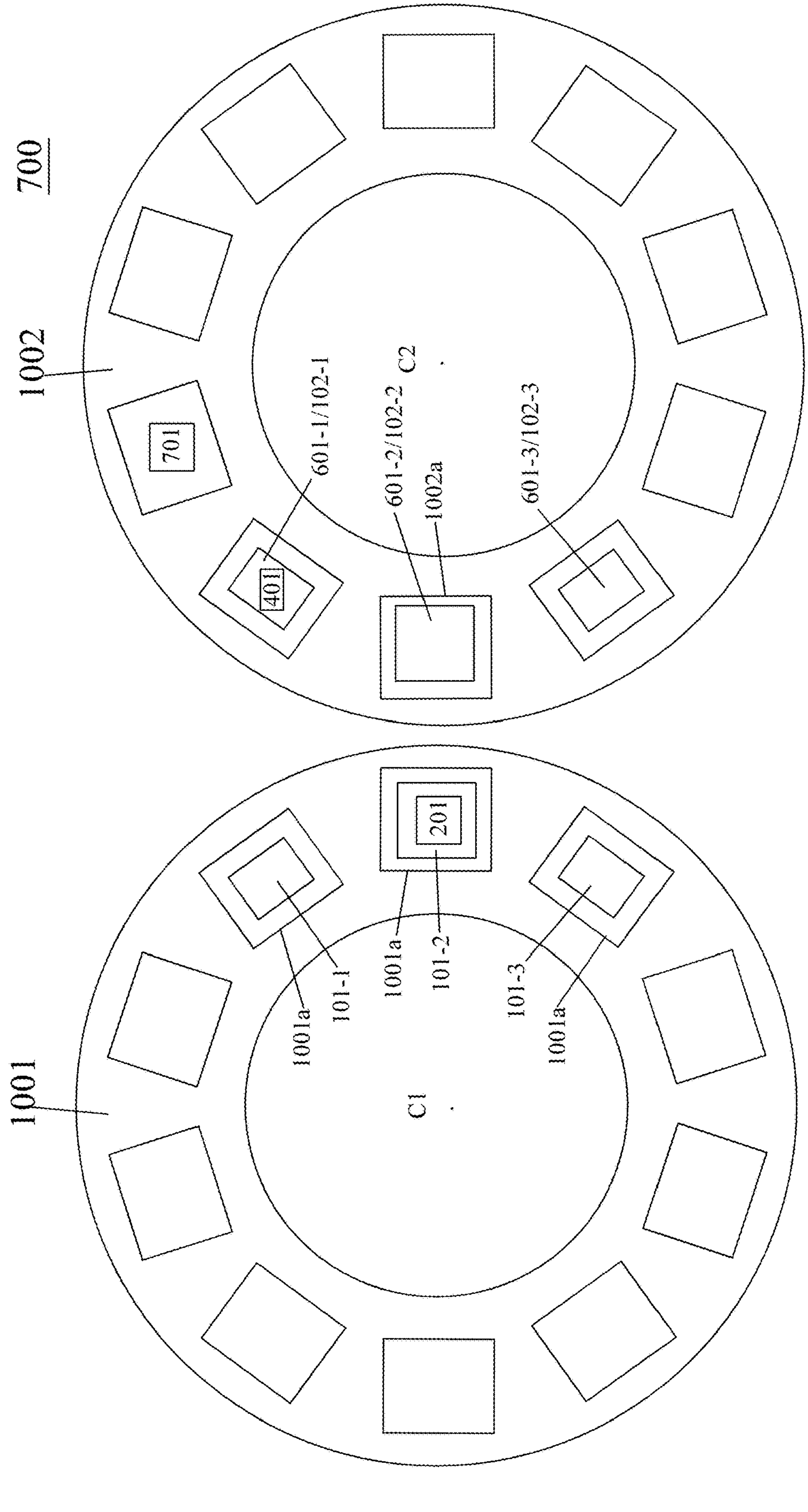

After rotating the first carrier 1001 and the second carrier 1002 in the corresponding predetermined intervals, the second lower mold 102-2 is conveyed from the second holder 1002*a* to the first holder 1001*a* opposite to the second holder 1002*a*, as shown in FIG. 44. The conveying of the second lower mold 102-2 is in a way similar to the steps described above or illustrated in FIG. 41. The second lower mold 102-2 is now disposed under the first injector 201. Subsequently, the first material 301 is injected towards the second lower mold 102-2, similar to the steps as described above or illustrated in FIG. 6. After the injection of the first material 301, the first layer 301' is formed, similar to the steps as described above or illustrated in FIG. 7. After the formation of the first layer 301', the second lower mold 102-2 is conveyed back to the second holder 1002*a* as shown in FIG. 45, similar to the way described above or illustrated in FIG. 42.

During the conveying of the second lower mold 102-2 towards the first carrier 1001 (FIG. 44), the injection of the first material 301 (FIG. 44) from the first injector 201 towards the second lower mold 102-2, the formation of the first layer 301' in the second lower mold 102-2 and/or the conveying of the second lower mold 102-2 back to the second carrier 1002 (FIG. 45), the first layer 301' in the first lower mold 102-1 disposed under the second injector 401 undergoes treatment such as surface treatment or application of the adhesive 501 over the first layer 301', similar to the way as described above or illustrated in FIG. 9. In some embodiments, the adhesive 501 is dispensed on the first layer 301' in the first lower mold 102-1 during the conveying of the second lower mold 102-2 towards the first carrier 1001 (FIG. 44), the injection of the first material 301 (FIG. 44) towards the second lower mold 102-2, the formation of the first layer 301' in the second lower mold 102-2 and/or the conveying of the second lower mold 102-2 back to the second carrier 1002 (FIG. 45).

Figure 46:
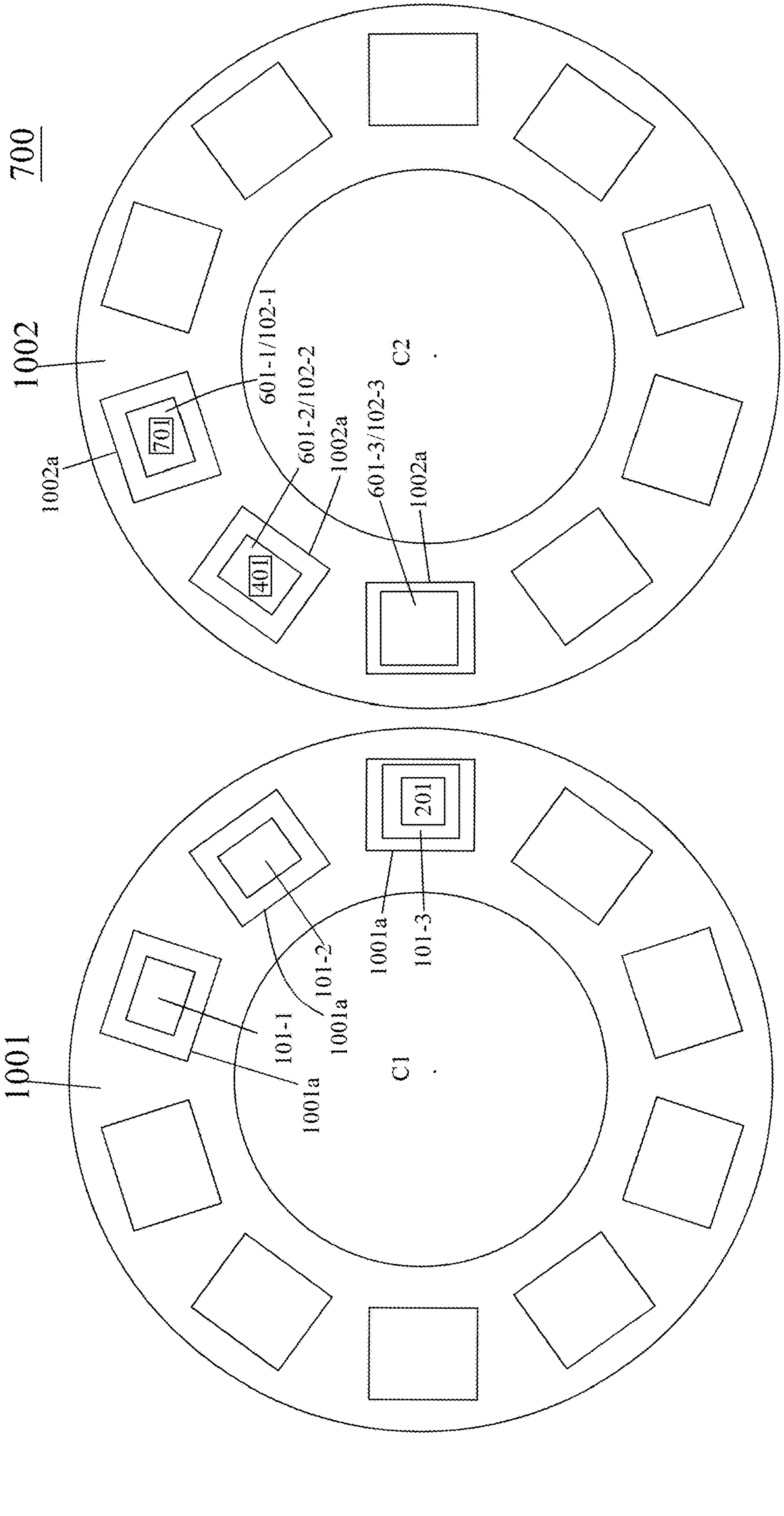

After the second lower mold 102-2 is returned to the second carrier 1002 and the treatment for the first layer 301' in the first lower mold 102-1 is accomplished, the first carrier 1001 and the second carrier 1002 are further rotated as shown in FIG. 46.

Figure 47:
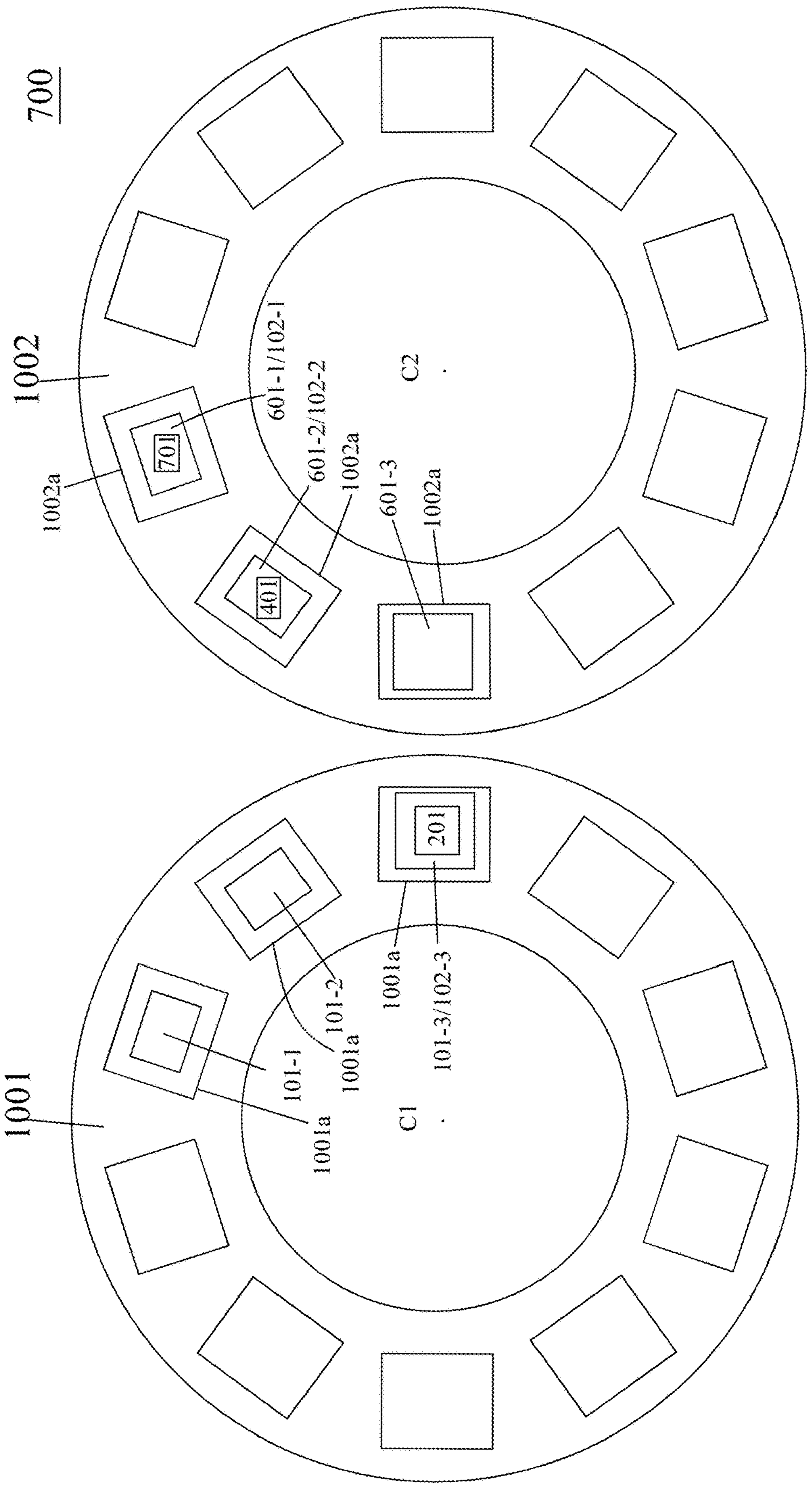
Figure 48:
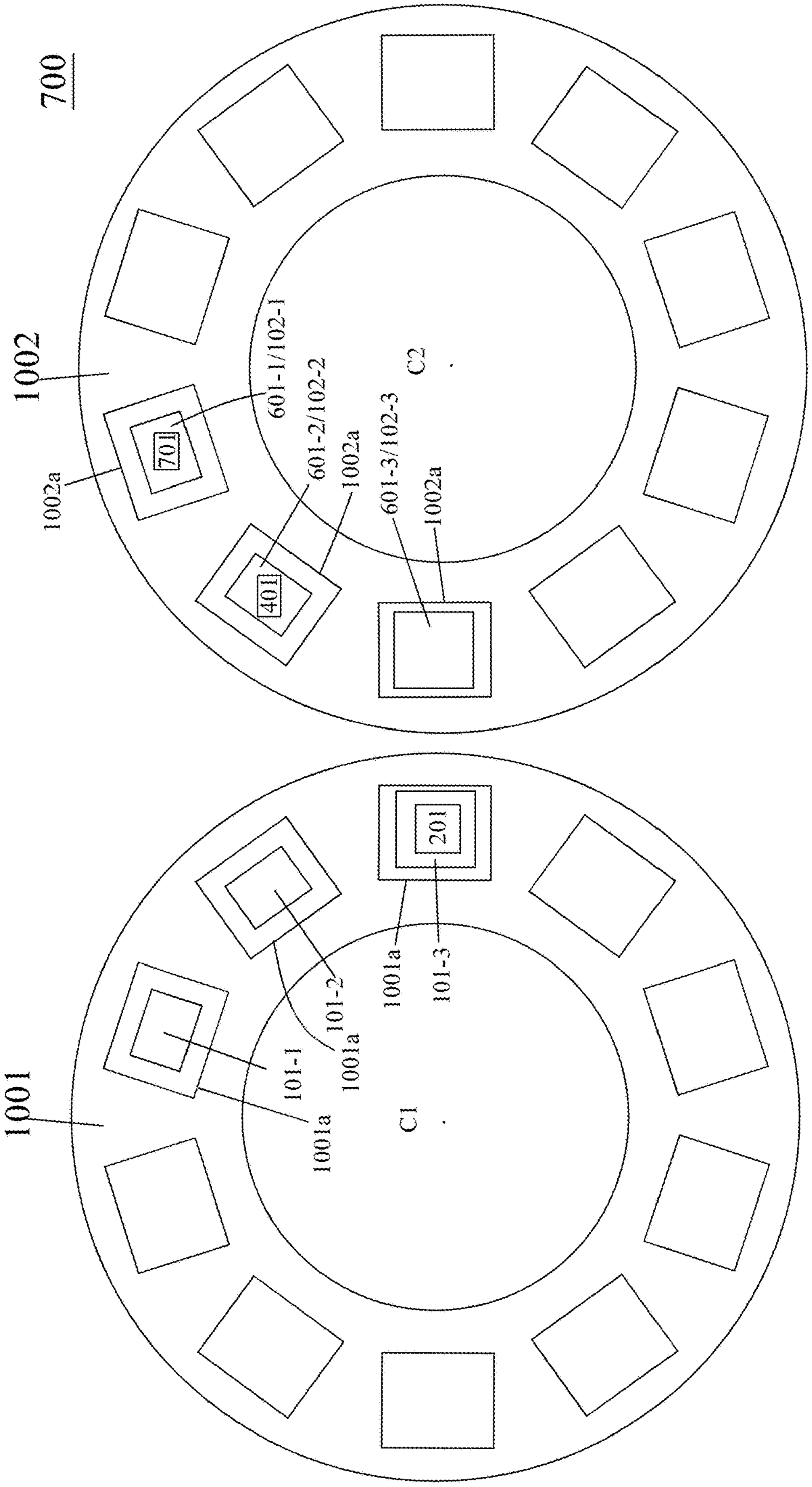

After the rotation of the second carrier 1002, the first upper mold 101-3 is disposed opposite to the second upper mold 601-3 and the third lower mold 102-3, as shown in FIG. 46. The conveying of the third lower mold 102-3 from the second carrier 1002 to the first carrier 1001 as shown in FIG. 47, the injection of the first material 301 towards the third lower mold 102-3 by the first injector 201 as shown in FIG. 47, the formation of the first layer 301' in the third lower mold 102-3 and the conveying of the third lower mold 102-3 back to the second carrier 1002 as shown in FIG. 48 are performed in the way similar to steps as described above or illustrated in FIGS. 41 to 45.

After the rotation of the second carrier 1002, the second upper mold 601-2 is disposed above the lower mold 102-2 as shown in FIG. 46. During the conveying of the lower mold 102-3 towards the first carrier 1001 (FIG. 47), the injection of the first material 301 (FIG. 47) from the first injector 201 towards the third lower mold 102-3, the formation of the first layer 301' in the third lower mold 102-3 and/or the conveying of the third lower mold 102-3 back to the second carrier 1002 (FIG. 48), the first layer 301' in the second lower mold 102-2 disposed under the second injector 401 undergoes treatment such as surface treatment or application of the adhesive 501 over the first layer 301', similar to the way as described above or illustrated in FIG. 9 or FIGS. 43-45. In some embodiments, the adhesive 501 is dispensed on the first layer 301' in the lower mold 102-2 during the conveying of the lower mold 102-3 towards the first carrier 1001 (FIG. 47), the injection of the first material 301 (FIG. 47) from the first injector 201 towards the lower mold 102-3, the formation of the first layer 301' in the lower mold 102-3 and/or the conveying of the lower mold 102-3 back to the second carrier 1002 (FIG. 48).

Furthermore, after the rotation of the second carrier 1002, the second upper mold 601-1 is disposed above the first lower mold 102-1 as shown in FIG. 46. After the disposing of the lower mold 102-1 under the second upper mold 601-1, the second molding device 200 now refers to the second upper mold 601-1 and the lower mold 102-1. The second molding device 200 is in configuration as described above or illustrated in FIGS. 10-13. The second upper mold 601-1 is engaged with the first lower mold 102-1. As such, the second molding device 200 is changed from the open configuration to the closed configuration, similar to the way described above or illustrated in FIGS. 9-11.

During the conveying of the third lower mold 102-3 towards the first carrier 1001 (FIG. 47), the injection of the first material 301 (FIG. 47) from the first injector 201 towards the third lower mold 102-3, the formation of the first layer 301' in the third lower mold 102-3 and/or the conveying of the third lower mold 102-3 back to the second carrier 1002 (FIG. 48), the second material 801 is injected from the third injector 701 towards the first layer 301', similar to the way as described above or illustrated in FIG. 12.

The method M20 includes operation O207, which includes injecting a second material 801 into a second mold cavity 103-2 defined by the first lower mold 102-1 and the second upper mold 601-1. During or after the closing of the second molding device 200, the second material 801 is injected towards the first layer 301' into the second mold cavity 103-2 from the second injector 701 via a second outlet 701*a*, similar to the way described above or illustrated in FIG. 13. In some embodiments, the second material 801 is foamable material.

The method M20 includes operation O208, which includes forming a second layer 801' from the second material 801 disposed over the first layer 301'. In some embodiments, a duration for formation of the second layer 801' (total time of injecting the second material 801, foaming and cooling of the second material 801, formation of the second layer 801') is more than 60 seconds or is about 100 seconds to 150 seconds. After the formation of the second layer 801', the second injector 701 leaves the second molding device 200, and the second upper mold 601-1 is disengaged and withdrawn from the lower mold 102-1, similar to the way described above or illustrated in FIG. 13. The second molding device 200 is changed from the closed configuration (FIG. 12) to the open configuration (FIG. 13).

After the opening of the second molding device 200, an article similar to or different from the article 140 including the first layer 301' and the second layer 801' is formed and can be picked out from the lower mold 102-1, similar to the way described above or illustrated in FIGS. 14A-14C. Since all layers (the first layer 301', the second layer 801', etc.) of the article 140 are fabricated using the lower molds 102-1, 102-2, 102-3, adhesion between the first layer 301' and the second layer 801' is more secure and improved. Therefore, reliability and quality of the article 140 produced by the above injection molding system 700 is improved or increased.

Figure 49:
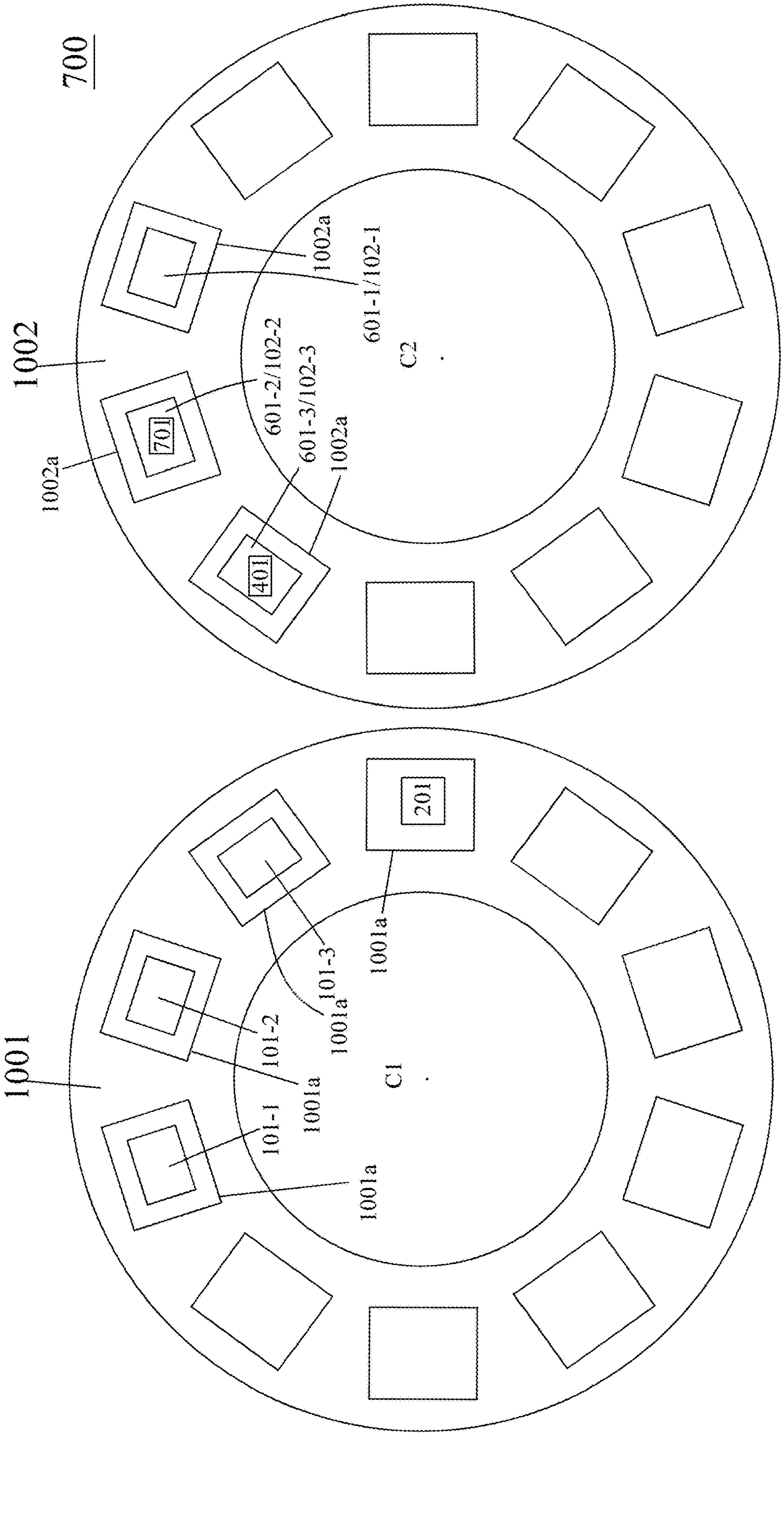

Afterwards, the first carrier 1001 and the second carrier 1002 are further rotated as shown in FIG. 49, and similar steps as described above or illustrated in FIGS. 40-48 are repeated.

Figure 50:
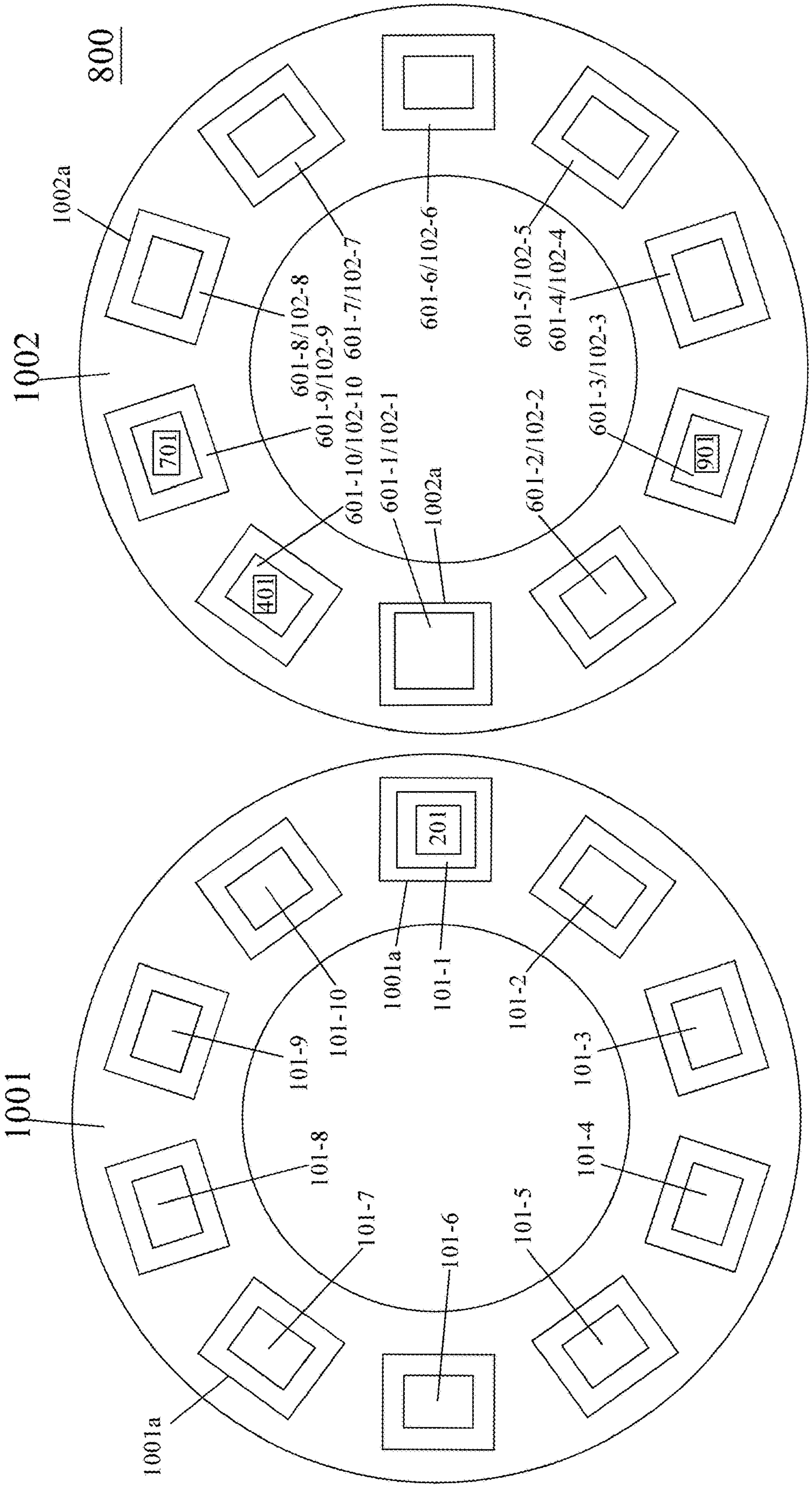

In some embodiments, the injection molding method M10 as described above or illustrated in FIGS. 1-18 is implemented by an injection molding system 800 as shown in FIG. 50. FIG. 50 is schematic top view of the injection molding system 800. The injection molding system of FIG. 50 is similar to the one as described above or illustrated in FIGS. 40-49. In some embodiments, the injection molding system 800 of FIG. 50 is in full capacity, that all first holders 1001*a* are holding corresponding first upper molds 101-1, 101-2, 101-3, 101-4, 101-5, 101-6, 101-7, 101-8, 101-9 and 101-10, and all second holders 1002*a* are holding corresponding second upper molds 601-1, 601-2, 601-3, 601-4, 601-5, 601-6, 601-7, 601-8, 601-9 and 601-10 and corresponding lower molds 102-1, 102-2, 102-3, 102-4, 102-5, 102-6, 102-7, 102-8, 102-9 and 102-10. In some embodiments, after the formation of an article at the third injector 701, the second upper mold 601 and the lower mold 102 including the article therein are rotated by the second carrier 1002. The article including the first layer 301' and the second layer 801' is ready to be picked out from a port 901 when the second upper mold 101 and the lower mold 102 are rotated and arrived at the port 901.

Figure 51:
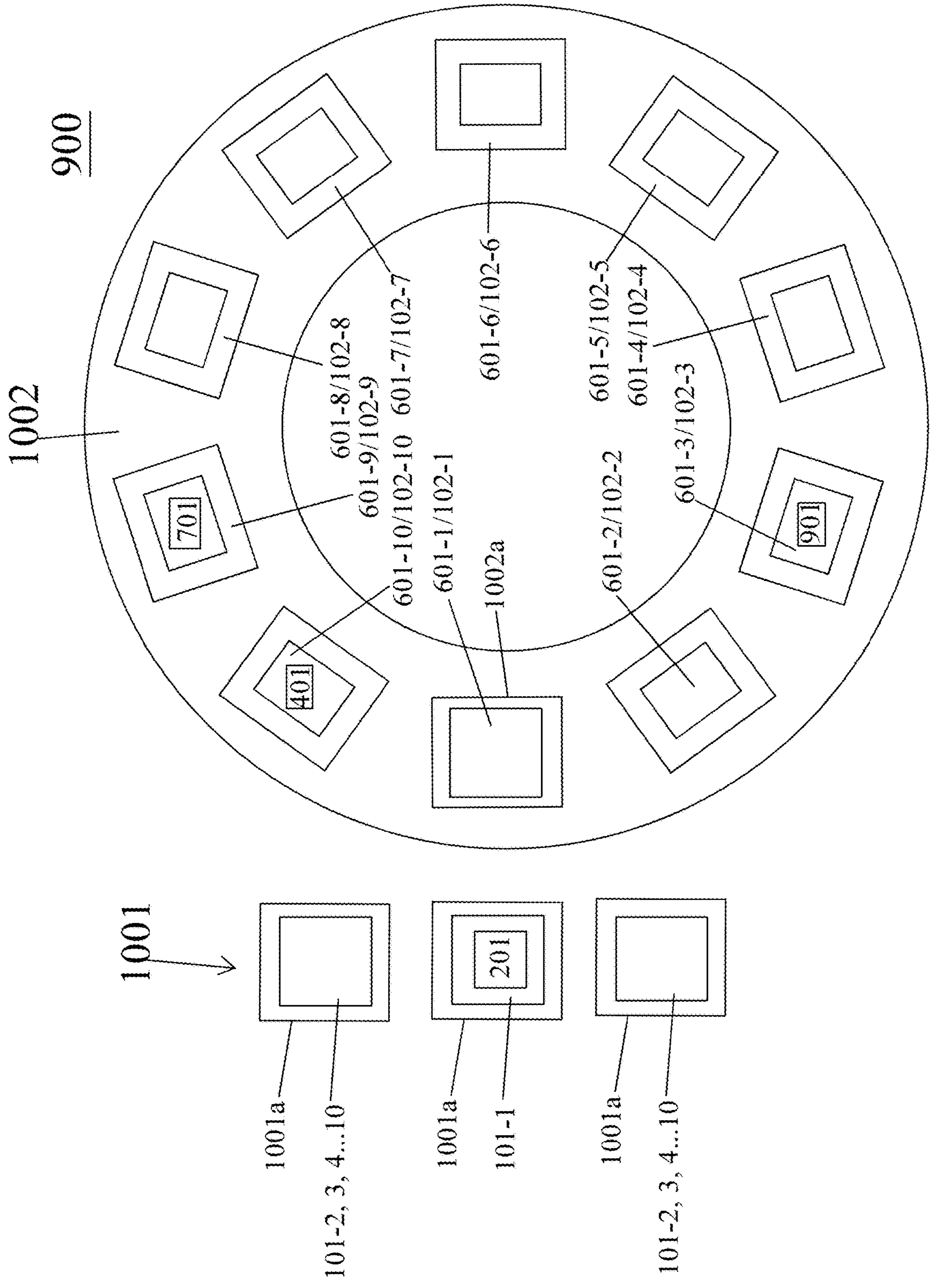
Figure 52:
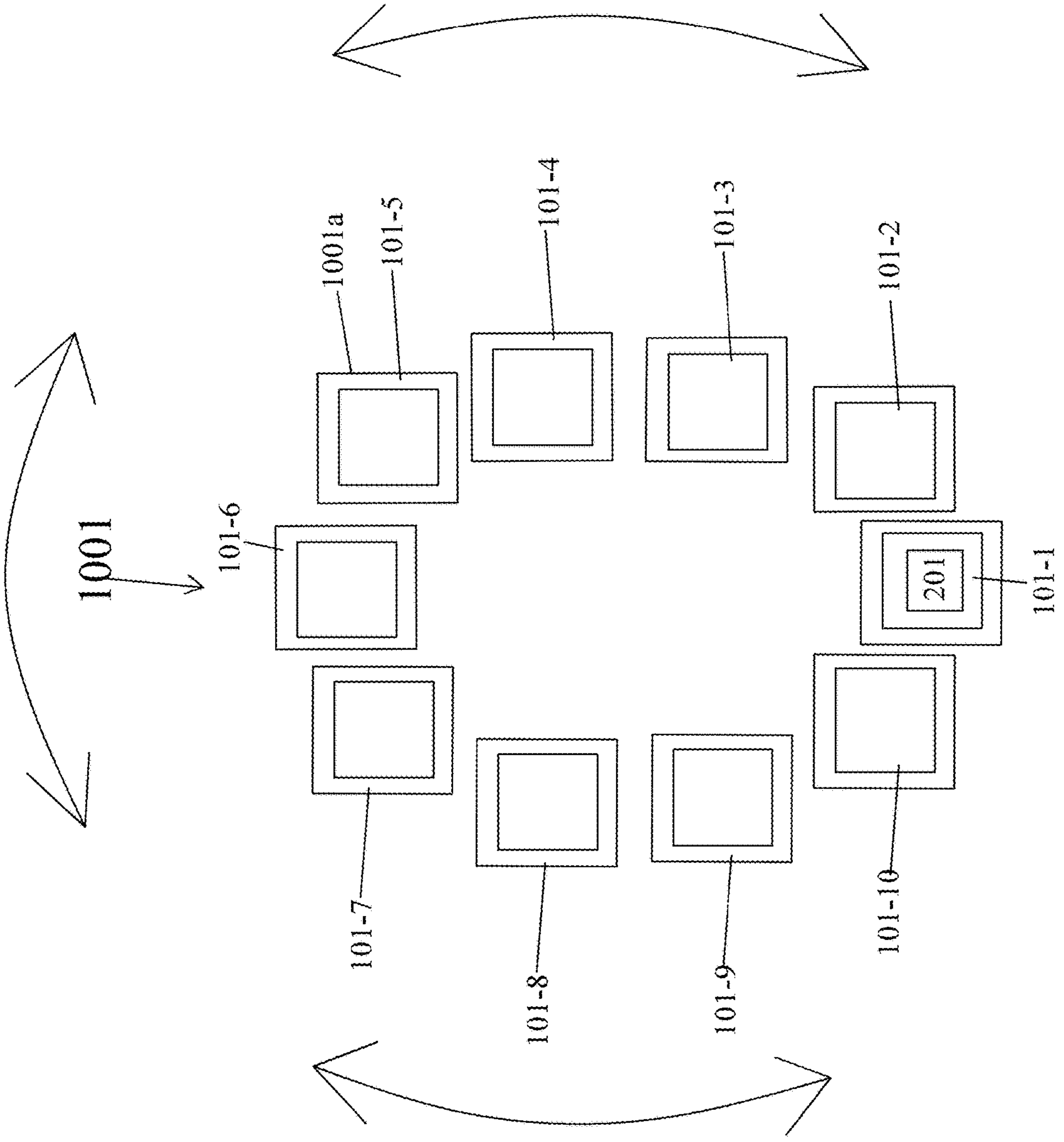

In some embodiments, the injection molding method M10 as described above or illustrated in FIGS. 1-18 is implemented by an injection molding system 900 as shown in FIGS. 51 and 52. FIG. 51 is schematic top view of the injection molding system 900. In some embodiments, the second carrier 1002 is configured as a turntable, as described above or illustrated in FIGS. 40-50. FIG. 52 is schematic side view of the first carrier 1001 in FIG. 51. In some embodiments, the first holders 1001*a* stack over each other as shown in FIG. 52. In some embodiments, the upper molds 101-1, 101-2, 101-3, 101-4, 101-5, 101-6, 101-7, 101-8, 101-9 and 101-10 are stacked over each other, the second upper molds 601-1, 601-2, 601-3, 601-4, 601-5, 601-6, 601-7, 601-8, 601-9 and 601-10 are stacked over each other. In some embodiments, the first carrier 1001 is rotated along a direction (indicated by arrows in FIG. 52) during the implementation of the injection molding method described above.

An aspect of this disclosure relates to an injection molding method. The method includes providing a molding device including a first mold, a second mold over the first mold and a first mold cavity defined by the first mold and the second mold; injecting a first material into the first mold cavity; forming a first layer from the first material; replacing the second mold by a third mold; injecting a second material into a second mold cavity defined by the first mold and the third mold; and forming a second layer from the second material disposed over the first layer, wherein the first material is different from the second material.

In some embodiments, a density of the second layer is substantially less than a density of the first layer. In some embodiments, an elasticity of the second layer is substantially greater than an elasticity of the first layer. In some embodiments, the first material is non-foamable material, and the second material is foamable material. In some embodiments, the replacement of the second mold includes removing the second mold, disposing the third mold over the first mold and moving the first mold towards the third mold to form the second mold cavity. In some embodiments, the method further comprising disposing a component within an opening of the third mold prior to the injection of the second material, wherein the component is attached to and disposed over the second layer. In some embodiments, the method further comprising disposing an adhesive over the first layer prior to the injection of the second material. In some embodiments, the first layer includes a first portion and a second portion separated from the first portion, and the second layer is disposed over the first portion and the second portion. In some embodiments, during or after the injection of the first material into the first mold cavity, the first mold cavity is expanded by moving the first mold away from the second mold to form a third mold cavity. In some embodiments, a volume of the third mold cavity is substantially greater than a volume of the first mold cavity.

An aspect of this disclosure relates to an injection molding method. The method includes providing a first carrier and a second carrier disposed adjacent to the first carrier, a first upper mold held by the first carrier, and a second upper mold held by the second carrier; disposing a first lower mold under the second upper mold; conveying the first lower mold from the second carrier to the first carrier to dispose the first lower mold under the first upper mold; injecting a first material into a first mold cavity defined by the first lower mold and the first upper mold; forming a first layer from the first material; conveying the first lower mold holding the first layer from the first carrier to the second carrier to dispose the first lower mold under the second upper mold; injecting a second material into a second mold cavity defined by the first lower mold and the second upper mold; and forming a second layer from the second material disposed over the first layer.

In some embodiments, the method further includes providing an injector fixedly disposed over the second carrier and configured to inject the second material; rotating the second carrier to convey the first lower mold and the second upper mold towards the injector prior to the injection of the second material. In some embodiments, the first carrier and the second carrier are rotatable about a center of the first carrier and a center of the second carrier respectively. In some embodiments, the first carrier is rotatable in anti-clockwise direction while the second carrier is rotatable in clockwise direction, or the first carrier is rotatable in clockwise direction while the second carrier is rotatable in anti-clockwise direction. In some embodiments, the method further includes providing a third upper mold held by the first carrier and a fourth upper mold held by the second carrier; disposing a second lower mold under the fourth upper mold; conveying the second lower mold from the second carrier to the first carrier to dispose the second lower mold under the third upper mold; injecting the first material into a third mold cavity defined by the second lower mold and the third upper mold; forming a third layer from the first material; conveying the second lower mold holding the third layer from the first carrier to the second carrier to dispose the second lower mold under the fourth upper mold; injecting the second material into a fourth mold cavity defined by the second lower mold and the fourth upper mold; and forming a fourth layer from the second material disposed over the third layer. In some embodiments, the third upper mold and the first upper mold are annularly arranged at the first carrier, and the fourth upper mold and the second upper mold are annularly arranged at the second carrier. In some embodiments, the injection of the first material into the third mold cavity and the injection of the second material into the second mold cavity are performed simultaneously. In some embodiments, the third layer and the first layer are formed simultaneously. In some embodiments, the method further includes injecting an adhesive layer into the second mold cavity defined by the first lower mold and the second upper mold before injecting the second material. In some embodiments, the first upper mold and the third upper mold are stacked over each other, the second upper mold and the fourth upper mold are stacked over each other.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods and steps.

What is claimed is:

1. An injection molding method, comprising:

providing a first carrier and a second carrier disposed adjacent to the first carrier, a first mold held by the first carrier, and a second mold held by the second carrier;

disposing a third mold adjacent to the first mold held by the first carrier;

injecting a first material into a first mold cavity defined by the third mold and the first mold after the third mold is engaged with the first mold;

forming a first layer from the first material injected into the first mold cavity;

conveying the third mold holding the first layer formed from the first material and injected into the first mold cavity from the first carrier to the second carrier to dispose the third mold adjacent to the second mold held by the second carrier;

injecting a second material into a second mold cavity defined by the third mold and the second mold after the third mold is engaged with the second mold; and forming a second layer from the second material injected into the second mold cavity and disposed over the first layer.

2. The injection molding method of claim 1, further comprising rotating the first carrier after the conveying the third mold to the second carrier.

3. The injection molding method of claim 1, after the formation of the first layer and the second layer, further comprising:

rotating the second carrier to displace the second mold and the third mold holding the first layer and the second layer;

taking out an article including the first layer and the second layer from the second mold cavity.

4. The injection molding method of claim 1, further comprising:

providing a fourth mold held by the first carrier and a fifth mold held by the second carrier;

disposing a sixth mold under the fourth mold;

injecting the first material into a third mold cavity defined by the sixth mold and the fourth mold;

forming a third layer from the first material;

conveying the sixth mold holding the third layer from the first carrier to the second carrier to dispose the sixth mold under the fifth mold;

injecting the second material into a fourth mold cavity defined by the sixth mold and the fifth mold; and forming a fourth layer from the second material disposed over the third layer.

5. The injection molding method of claim 4, wherein the injection of the first material into the third mold cavity and the injection of the second material into the second mold cavity are performed simultaneously.

6. The injection molding method of claim 4, after the formation of the third layer and the fourth layer, further comprising:

rotating the second carrier to displace the fifth mold and the sixth mold holding the third layer and the fourth layer;

taking out an article including the third layer and the fourth layer from the fourth mold cavity.

7. The injection molding method of claim 4, wherein the first mold and the fourth mold are neighbored with each other, the second mold and the fifth mold are neighbored with each other.

8. The injection molding method of claim 4, wherein the first mold and the fourth mold are stacked over each other, the second mold and the fifth mold are stacked over each other.

* * * * *